United States Patent
Maynard et al.

(10) Patent No.: US 12,436,916 B2
(45) Date of Patent: Oct. 7, 2025

(54) APPARATUS AND METHODS FOR LIGHTWEIGHT TRANSCODING

(71) Applicant: Time Warner Cable Enterprises LLC, St. Louis, MO (US)

(72) Inventors: Stephen Maynard, Thornton, CO (US); Trever Hallock, Westminster, CO (US); Nicholas Nielsen, Erie, CO (US); Ernest Biancarelli, Denver, CO (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 0 days.

(21) Appl. No.: 16/538,714

(22) Filed: Aug. 12, 2019

(65) Prior Publication Data

US 2020/0034332 A1    Jan. 30, 2020

Related U.S. Application Data

(62) Division of application No. 14/452,359, filed on Aug. 5, 2014, now abandoned.

(51) Int. Cl.
    *G06F 16/11*      (2019.01)
    *G06F 16/178*      (2019.01)
    (Continued)

(52) U.S. Cl.
    CPC ........ *G06F 16/116* (2019.01); *G06F 16/1794* (2019.01); *H04N 19/23* (2014.11);
    (Continued)

(58) Field of Classification Search
    CPC ... G06F 16/116; G06F 16/1794; H04N 19/23; H04N 19/40; H04N 19/42; H04N 19/436
    (Continued)

(56) References Cited

U.S. PATENT DOCUMENTS 5,341,318 A    8/1994   Balkanski et al.
RE35,651 E    11/1997   Bradley et al.
(Continued)

FOREIGN PATENT DOCUMENTS

CA      2643806 C      6/2013
WO     WO-0110125 A1    2/2001
WO    WO-2004008693 A1   1/2004

OTHER PUBLICATIONS

Ming et al, "APS Referencing", Joint Collaborative Team on Video Coding (JCT-VC) 8th Meeting: San José, CA, USA, Feb. 1-10, 2012, pp. 1-11 (Year: 2012).*

*Primary Examiner* — Tony Mahmoudi
*Assistant Examiner* — Kamal K Dewan
(74) *Attorney, Agent, or Firm* — Patent Beach PC

(57) ABSTRACT

Apparatus and methods for lightweight transcoding. In one embodiment, a minimal function transcoder is disclosed which supports multiple devices requiring various video formats. Transcoding functionality may be downloaded to an existing device and comprises using an intermediate set of data resulting from a partial decode of an input stream that is temporarily stored until all transformation operations have completed. Premises devices register to the transcoder and the transcoder transcodes content requested by the registered devices (i) upon detection that the registered device is "in use"; (ii) at the time of original content playback or broadcast; and/or (iii) at a time prior to a previously scheduled time of intended use. The transcoder exploits the similarities between the mechanisms by which the various encoding formats and, in one variant, ignores some of the features of the more advanced content formats to arrive at a "just-in-time" or "near real-time" transcoded content.

34 Claims, 15 Drawing Sheets

(51) Int. Cl.
*H04N 19/23* (2014.01)
*H04N 19/40* (2014.01)
*H04N 19/42* (2014.01)
*H04N 19/436* (2014.01)
*H04N 19/46* (2014.01)

(52) U.S. Cl.
CPC ............ *H04N 19/40* (2014.11); *H04N 19/46* (2014.11); *H04N 19/42* (2014.11); *H04N 19/436* (2014.11)

(58) Field of Classification Search
USPC ....................................................... 707/809
See application file for complete search history.

(56) References Cited

U.S. PATENT DOCUMENTS

| | | |
|---|---|---|
| 5,734,380 A | 3/1998 | Adams et al. |
| 5,793,410 A | 8/1998 | Rao |
| 5,815,662 A | 9/1998 | Ong |
| 6,105,134 A | 8/2000 | Pinder et al. |
| 6,124,878 A | 9/2000 | Adams et al. |
| 6,167,432 A | 12/2000 | Jiang |
| 6,175,856 B1 | 1/2001 | Riddle |
| 6,216,152 B1 | 4/2001 | Wong et al. |
| 6,219,710 B1 | 4/2001 | Gray et al. |
| 6,252,964 B1 | 6/2001 | Wasilewski et al. |
| 6,256,393 B1 | 7/2001 | Safadi et al. |
| 6,275,618 B1 | 8/2001 | Kodama |
| 6,324,217 B1 | 11/2001 | Gordon |
| 6,337,715 B1 | 1/2002 | Inagaki et al. |
| 6,339,785 B1 | 1/2002 | Feigenbaum |
| 6,463,508 B1 | 10/2002 | Wolf et al. |
| 6,516,412 B2 | 2/2003 | Wasilewski et al. |
| 6,594,699 B1 | 7/2003 | Sahai et al. |
| 6,651,103 B1 | 11/2003 | Markowitz et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,745,245 B1 | 6/2004 | Carpenter |
| 6,772,435 B1 | 8/2004 | Thexton et al. |
| 6,778,495 B1 | 8/2004 | Blair |
| 6,799,196 B1 | 9/2004 | Smith |
| 6,859,839 B1 | 2/2005 | Zahorjan et al. |
| 6,868,439 B2 | 3/2005 | Basu et al. |
| 6,948,183 B1 | 9/2005 | Peterka |
| 6,961,430 B1 | 11/2005 | Gaske et al. |
| 6,981,045 B1 | 12/2005 | Brooks |
| 6,985,934 B1 | 1/2006 | Armstrong et al. |
| 7,010,801 B1 | 3/2006 | Jerding et al. |
| 7,024,461 B1 | 4/2006 | Janning et al. |
| 7,027,460 B2 | 4/2006 | Iyer et al. |
| 7,031,348 B1 | 4/2006 | Gazit |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,058,387 B2 | 6/2006 | Kumar et al. |
| 7,058,721 B1 | 6/2006 | Ellison et al. |
| 7,089,577 B1 | 8/2006 | Rakib et al. |
| 7,093,272 B1 | 8/2006 | Shah-Nazaroff et al. |
| 7,103,906 B1 | 9/2006 | Katz et al. |
| 7,107,462 B2 | 9/2006 | Fransdonk |
| 7,127,619 B2 | 10/2006 | Unger et al. |
| 7,133,837 B1 | 11/2006 | Barnes, Jr. |
| 7,174,385 B2 | 2/2007 | Li |
| 7,178,161 B1 | 2/2007 | Fristoe et al. |
| 7,181,010 B2 | 2/2007 | Russ et al. |
| 7,194,756 B2 | 3/2007 | Addington et al. |
| 7,200,788 B2 | 4/2007 | Hiraki et al. |
| 7,203,940 B2 | 4/2007 | Barmettler et al. |
| 7,209,973 B2 | 4/2007 | Tormasov et al. |
| 7,216,265 B2 | 5/2007 | Hughes et al. |
| 7,225,164 B1 | 5/2007 | Candelore et al. |
| 7,225,458 B2 | 5/2007 | Klauss et al. |
| 7,254,608 B2 | 8/2007 | Yeager et al. |
| 7,257,650 B2 | 8/2007 | Maciesowicz |
| 7,266,198 B2 | 9/2007 | Medvinsky |
| 7,266,611 B2 | 9/2007 | Jabri et al. |
| 7,266,726 B1 | 9/2007 | Ladd et al. |
| 7,305,691 B2 | 12/2007 | Cristofalo |
| 7,325,073 B2 | 1/2008 | Shao et al. |
| 7,370,120 B2 | 5/2008 | Kirsch et al. |
| 7,376,386 B2 | 5/2008 | Phillips et al. |
| 7,403,618 B2 | 7/2008 | Van Rijnsoever et al. |
| 7,434,245 B1 | 10/2008 | Shiga et al. |
| 7,602,820 B2 | 10/2009 | Helms et al. |
| 7,617,516 B2 | 11/2009 | Huslak et al. |
| 7,690,020 B2 | 3/2010 | Lebar |
| 7,757,251 B2 | 7/2010 | Gonder et al. |
| 7,809,774 B2 | 10/2010 | Tichy et al. |
| 7,907,580 B2 | 3/2011 | Ametsitsi |
| 7,929,823 B2 | 4/2011 | Roh |
| 8,085,830 B2 | 12/2011 | Ametsitsi |
| 8,170,065 B2 | 5/2012 | Hasek et al. |
| 8,213,358 B1 | 7/2012 | Goyal et al. |
| 8,218,651 B1 | 7/2012 | Eshet et al. |
| 8,325,821 B1 | 12/2012 | Kizhepat et al. |
| 8,375,140 B2 | 2/2013 | Tippin et al. |
| 8,521,002 B2 | 8/2013 | Yahata et al. |
| 8,613,089 B1 | 12/2013 | Holloway et al. |
| 8,667,548 B2 | 3/2014 | Chen et al. |
| 8,818,948 B2 | 8/2014 | Lin et al. |
| 9,112,938 B2 | 8/2015 | Tippin et al. |
| 9,215,423 B2 | 12/2015 | Kimble et al. |
| 9,420,317 B2 | 8/2016 | McCarthy et al. |
| 9,591,069 B2 | 3/2017 | Thornburgh et al. |
| 9,591,353 B2 | 3/2017 | Wright et al. |
| 9,699,236 B2 | 7/2017 | Gopalakrishnan et al. |
| 9,910,742 B1 | 3/2018 | Faibish et al. |
| 9,954,930 B2 | 4/2018 | Panchapakesan et al. |
| 10,007,673 B1 | 6/2018 | Faibish et al. |
| 10,078,639 B1 | 9/2018 | Faibish et al. |
| 10,116,629 B2 | 10/2018 | Crofton et al. |
| 10,162,828 B2 | 12/2018 | Foster |
| 10,264,072 B2 | 4/2019 | Crofton et al. |
| 10,356,158 B2 | 7/2019 | Crofton et al. |
| 10,404,798 B2 | 9/2019 | Crofton et al. |
| 10,893,468 B2 | 1/2021 | Da Silva et al. |
| 10,939,142 B2 | 3/2021 | Jayawardene et al. |
| 11,190,989 B2 | 11/2021 | Sirotkin et al. |
| 11,258,675 B2 | 2/2022 | Dinh et al. |
| 11,683,399 B1 | 6/2023 | Kiviranta et al. |
| 2002/0019984 A1 | 2/2002 | Rakib |
| 2002/0032754 A1 | 3/2002 | Logston et al. |
| 2002/0049980 A1 | 4/2002 | Hoang |
| 2002/0053082 A1 | 5/2002 | Weaver et al. |
| 2002/0059619 A1 | 5/2002 | Lebar |
| 2002/0100059 A1 | 7/2002 | Buehl et al. |
| 2002/0133486 A1 | 9/2002 | Yanagihara et al. |
| 2002/0147771 A1 | 10/2002 | Traversat et al. |
| 2002/0152299 A1 | 10/2002 | Traversat et al. |
| 2002/0154694 A1 | 10/2002 | Birch |
| 2002/0162109 A1 | 10/2002 | Shteyn |
| 2002/0172281 A1 | 11/2002 | Mantchala et al. |
| 2002/0196939 A1 | 12/2002 | Unger et al. |
| 2003/0002583 A1 | 1/2003 | Geerlings |
| 2003/0021412 A1 | 1/2003 | Candelore et al. |
| 2003/0025832 A1 | 2/2003 | Swart et al. |
| 2003/0056217 A1 | 3/2003 | Brooks |
| 2003/0067877 A1 | 4/2003 | Sivakumar et al. |
| 2003/0074565 A1 | 4/2003 | Wasilewski et al. |
| 2003/0088876 A1 | 5/2003 | Mao et al. |
| 2003/0095791 A1 | 5/2003 | Barton et al. |
| 2003/0118014 A1 | 6/2003 | Iyer et al. |
| 2003/0135860 A1 | 7/2003 | Dureau |
| 2003/0152148 A1* | 8/2003 | Laksono ........ H04N 21/440263 375/E7.18 |
| 2003/0161473 A1 | 8/2003 | Fransdonk |
| 2003/0217365 A1 | 11/2003 | Caputo |
| 2003/0235396 A1 | 12/2003 | Boston et al. |
| 2004/0013195 A1* | 1/2004 | Panusopone ........... H04N 19/59 375/E7.199 |
| 2004/0045030 A1 | 3/2004 | Reynolds et al. |

(56) References Cited

U.S. PATENT DOCUMENTS

| | | |
|---|---|---|
| 2004/0081242 A1 | 4/2004 | Segev |
| 2004/0103437 A1 | 5/2004 | Allegrezza et al. |
| 2004/0123313 A1 | 6/2004 | Koo et al. |
| 2004/0151249 A1 | 8/2004 | Morel |
| 2004/0181800 A1 | 9/2004 | Rakib et al. |
| 2004/0187150 A1 | 9/2004 | Gonder et al. |
| 2004/0193648 A1 | 9/2004 | Lai et al. |
| 2004/0193704 A1 | 9/2004 | Smith |
| 2004/0208247 A1 | 10/2004 | Barrau et al. |
| 2004/0228608 A1* | 11/2004 | Bak .................. H04N 21/42661 386/235 |
| 2004/0261114 A1 | 12/2004 | Addington et al. |
| 2004/0261116 A1 | 12/2004 | McKeown et al. |
| 2004/0267965 A1 | 12/2004 | Vasudevan et al. |
| 2005/0039206 A1 | 2/2005 | Opdycke |
| 2005/0050160 A1 | 3/2005 | Upendran et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0097598 A1 | 5/2005 | Pedlow et al. |
| 2005/0108529 A1 | 5/2005 | Juneau |
| 2005/0114900 A1 | 5/2005 | Ladd et al. |
| 2005/0125528 A1 | 6/2005 | Burke et al. |
| 2005/0132264 A1 | 6/2005 | Joshi et al. |
| 2005/0135476 A1 | 6/2005 | Gentric et al. |
| 2005/0232497 A1 | 10/2005 | Yogeshwar et al. |
| 2005/0289618 A1 | 12/2005 | Hardin |
| 2006/0010075 A1 | 1/2006 | Wolf |
| 2006/0020984 A1 | 1/2006 | Ban et al. |
| 2006/0036750 A1 | 2/2006 | Ladd et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0073843 A1 | 4/2006 | Aerrabotu et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0130107 A1 | 6/2006 | Gonder et al. |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0171390 A1 | 8/2006 | La |
| 2006/0218601 A1 | 9/2006 | Michel |
| 2006/0218604 A1 | 9/2006 | Riedl et al. |
| 2006/0248553 A1 | 11/2006 | Mikkelson et al. |
| 2006/0256376 A1 | 11/2006 | Hirooka |
| 2006/0271946 A1 | 11/2006 | Woundy et al. |
| 2006/0291506 A1 | 12/2006 | Cain |
| 2007/0022459 A1 | 1/2007 | Gaebel et al. |
| 2007/0047449 A1 | 3/2007 | Berger et al. |
| 2007/0053293 A1 | 3/2007 | McDonald et al. |
| 2007/0058718 A1 | 3/2007 | Shen et al. |
| 2007/0061490 A1* | 3/2007 | Sullivan ............. H04N 21/4402 341/50 |
| 2007/0061818 A1 | 3/2007 | Williams et al. |
| 2007/0076728 A1 | 4/2007 | Rieger et al. |
| 2007/0094691 A1 | 4/2007 | Gazdzinski |
| 2007/0101157 A1 | 5/2007 | Faria |
| 2007/0121678 A1 | 5/2007 | Brooks et al. |
| 2007/0124781 A1 | 5/2007 | Casey et al. |
| 2007/0130581 A1 | 6/2007 | Del et al. |
| 2007/0133942 A1 | 6/2007 | Moors et al. |
| 2007/0153820 A1 | 7/2007 | Gould |
| 2007/0156539 A1 | 7/2007 | Yates |
| 2007/0157234 A1 | 7/2007 | Walker |
| 2007/0162927 A1 | 7/2007 | Ramaswamy et al. |
| 2007/0177677 A1* | 8/2007 | Thomsen ............. H04N 19/42 375/240.26 |
| 2007/0204300 A1 | 8/2007 | Markley et al. |
| 2007/0204311 A1 | 8/2007 | Hasek et al. |
| 2007/0204314 A1 | 8/2007 | Hasek et al. |
| 2007/0217436 A1 | 9/2007 | Markley et al. |
| 2007/0230568 A1* | 10/2007 | Eleftheriadis .......... H04N 19/48 375/240.1 |
| 2007/0237219 A1* | 10/2007 | Schoenblum ........ H04N 19/124 375/240.01 |
| 2007/0241176 A1 | 10/2007 | Epstein et al. |
| 2007/0250872 A1 | 10/2007 | Dua |
| 2007/0250880 A1 | 10/2007 | Hainline |
| 2007/0271386 A1 | 11/2007 | Kurihara et al. |
| 2008/0022012 A1 | 1/2008 | Wang |
| 2008/0066112 A1 | 3/2008 | Bailey et al. |
| 2008/0098212 A1 | 4/2008 | Helms et al. |
| 2008/0098446 A1 | 4/2008 | Seckin et al. |
| 2008/0120676 A1* | 5/2008 | Morad ............. H04N 21/42607 375/E7.076 |
| 2008/0134156 A1 | 6/2008 | Osminer et al. |
| 2008/0134165 A1 | 6/2008 | Anderson et al. |
| 2008/0152316 A1 | 6/2008 | Sylvain |
| 2008/0155059 A1 | 6/2008 | Hardin et al. |
| 2008/0162713 A1* | 7/2008 | Bowra ............. H04N 21/43615 709/231 |
| 2008/0168066 A1 | 7/2008 | Ruiz-Velasco et al. |
| 2008/0201748 A1 | 8/2008 | Hasek et al. |
| 2008/0209499 A1 | 8/2008 | Ramesh et al. |
| 2008/0235746 A1 | 9/2008 | Peters et al. |
| 2008/0253447 A1 | 10/2008 | Cumpson et al. |
| 2008/0273591 A1 | 11/2008 | Brooks et al. |
| 2009/0006643 A1 | 1/2009 | Lee |
| 2009/0028182 A1 | 1/2009 | Brooks et al. |
| 2009/0100459 A1 | 4/2009 | Riedl et al. |
| 2009/0122863 A1 | 5/2009 | Gacke |
| 2009/0196344 A1* | 8/2009 | Brown ................... H04N 19/59 375/240.02 |
| 2009/0265617 A1 | 10/2009 | Randall et al. |
| 2010/0023579 A1 | 1/2010 | Chapweske et al. |
| 2010/0075606 A1 | 3/2010 | Hargreaves |
| 2010/0125883 A1 | 5/2010 | Mukherjee et al. |
| 2010/0223491 A1 | 9/2010 | Ladd et al. |
| 2010/0235432 A1 | 9/2010 | Trojer |
| 2011/0103374 A1 | 5/2011 | Lajoie et al. |
| 2012/0002728 A1 | 1/2012 | Eleftheriadis et al. |
| 2012/0047229 A1* | 2/2012 | Bennett .................... G09G 3/20 709/217 |
| 2012/0124636 A1 | 5/2012 | Schaffer |
| 2012/0179833 A1* | 7/2012 | Kenrick ................. H04N 19/40 709/231 |
| 2012/0222138 A1 | 8/2012 | Aaron |
| 2012/0278841 A1 | 11/2012 | Hasek et al. |
| 2013/0039433 A1* | 2/2013 | Ralston ................ G11B 27/034 375/240.26 |
| 2013/0091251 A1* | 4/2013 | Walker ............... H04N 21/6125 709/219 |
| 2013/0114744 A1* | 5/2013 | Mutton ................ H04N 19/177 375/240.26 |
| 2013/0117418 A1* | 5/2013 | Mutton ............. H04N 21/8456 709/219 |
| 2013/0246643 A1 | 9/2013 | Luby et al. |
| 2013/0325870 A1 | 12/2013 | Rouse et al. |
| 2013/0346766 A1 | 12/2013 | Tani |
| 2014/0013349 A1 | 1/2014 | Millar et al. |
| 2014/0019635 A1 | 1/2014 | Reznik et al. |
| 2014/0119195 A1 | 5/2014 | Tofighbakhsh et al. |
| 2014/0240591 A1* | 8/2014 | Rajagopalan ........ H04N 19/463 348/441 |
| 2014/0282789 A1 | 9/2014 | Zhang |
| 2014/0380398 A1 | 12/2014 | Schaffer |
| 2015/0092837 A1 | 4/2015 | Chen et al. |
| 2015/0195561 A1* | 7/2015 | Wang ..................... H04N 19/33 375/240.16 |
| 2015/0269393 A1 | 9/2015 | Lauder et al. |
| 2015/0281751 A1 | 10/2015 | Nemiroff et al. |
| 2016/0188344 A1 | 6/2016 | Tamir et al. |
| 2016/0191133 A1 | 6/2016 | Noh et al. |
| 2016/0308958 A1 | 10/2016 | Navali et al. |
| 2016/0316235 A1* | 10/2016 | Van Veldhuisen ......................... H04N 21/8547 |
| 2016/0342773 A1 | 11/2016 | Bradley |
| 2016/0360155 A1* | 12/2016 | Civanlar ................ H04N 7/147 |
| 2017/0185675 A1 | 6/2017 | Arngren |

(56) References Cited

U.S. PATENT DOCUMENTS

| | | |
|---|---|---|
| 2017/0289843 A1 | 10/2017 | Kim et al. |
| 2017/0302959 A1 | 10/2017 | Samchuk et al. |
| 2017/0337711 A1* | 11/2017 | Ratner ................. H04N 19/176 |
| 2017/0366833 A1 | 12/2017 | Amidei et al. |
| 2018/0097690 A1 | 4/2018 | Yocam et al. |
| 2018/0098292 A1 | 4/2018 | Gulati et al. |
| 2018/0131979 A1 | 5/2018 | Bayoumi et al. |
| 2018/0192094 A1 | 7/2018 | Barnett et al. |
| 2018/0213251 A1 | 7/2018 | Ikonin et al. |
| 2018/0368122 A1 | 12/2018 | Kuchibhotla et al. |
| 2018/0376380 A1 | 12/2018 | Leroux |
| 2018/0376474 A1 | 12/2018 | Khoryaev et al. |
| 2019/0014337 A1 | 1/2019 | Skupin et al. |
| 2019/0014363 A1 | 1/2019 | Skupin et al. |
| 2019/0069038 A1 | 2/2019 | Phillips |
| 2019/0166306 A1 | 5/2019 | Zen et al. |
| 2019/0268596 A1* | 8/2019 | Naletov ................. H04N 19/40 |
| 2019/0320494 A1 | 10/2019 | Jayawardene et al. |
| 2020/0004408 A1* | 1/2020 | Brockmann ..... H04N 21/25858 |
| 2020/0045110 A1 | 2/2020 | Varnica et al. |
| 2021/0250196 A1 | 8/2021 | Das et al. |

\* cited by examiner

| H.261 / H.262 | | H.265 |
|---|---|---|
| Frames | → | Video Object (1 seq, 1 obj, 1 layer per VOP) |
| Picture | → | VOP |
| GOP | → | GOV |
| No Shape | → | Shape == whole decode rectangle |
| 16x16 Blocks | → | Forced fixed size Transform Units to simple Coding Tree Units |
| Intra/Inter VLC | → | Force CABAC |
| Slice Start | → | Key Frame Marker or Tile Marker |
| Zig-Zag | → | Force Mode 3: Diagonal, Down, Left |

APPARATUS AND METHODS FOR LIGHTWEIGHT TRANSCODING

PRIORITY

This application is a divisional of and claims priority to co-owned and co-pending U.S. patent application Ser. No. 14/452,359 of the same title filed Aug. 5, 2014, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates generally to the field of data transcoding. More particularly, the present disclosure is related, in one exemplary aspect, to apparatus and methods for lightweight data transcoding.

Description of Related Technology

In the field of content and data delivery, many different compression and encoding standards have been developed. Standards such as the well-known H.261 and H.262 or Moving Picture Experts Group (MPEG-2) are commonly utilized for many audio/video data applications. More evolved standards include H.264 or MPEG-4 AVC (Advanced Video Coding) and its successor H.265 or High Efficiency Video Coding (HEVC).

H.264/MPEG-4 AVC is a block-oriented motion-compensation-based video compression standard, commonly used in, e.g., Blu-ray™ disc players, streaming Internet sources, web software, and also various HDTV broadcasts over terrestrial (ATSC, ISDB-T, DVB-T or DVB-T2), cable (DVB-C), and satellite (DVB-S and DVB-S2). H.264 is commonly used for lossy compression applications, and provides inter alia the benefit of good quality video at substantially reduced bitrate over prior codecs.

H.265 (HEVC) significantly increases the data compression ratio compared to H.264/MPEG-4 AVC at the same level of video quality. Alternatively, HEVC be used to provide substantially improved video quality at the same bit rate.

Current cable and satellite distribution infrastructures primarily deliver audio and video data using either H.261 or H.262. Moreover, current end-to-end systems include millions of interoperable encoders, multiplexers and decoding devices (such as e.g., set-top boxes) deployed. These devices are all compatible with one or both of H.261 and H.262; however, very few of these are compatible with the newer H.264 and/or H.265 encoding schemes. It is further appreciated that newer IP-capable devices may prefer or even require H.264 (and eventually H.265) for video consumption. Therefore, there is a need in a user's premises network for content rendered in a different format than what is currently provided via most content delivery networks.

Many products exist to transcode data, including those which are able to transcode between any of H.261, H.262, H.264, and/or H.265 (or others). However, such products require specialized hardware, are CPU intensive, and/or are comparatively expensive. Moreover, those which utilize software solutions for transcoding are slow, and cannot offer near-live or "on the fly" transcoding.

Hence, what is needed is a mechanism for efficient transcoding. Ideally, such mechanism would also be capable of sufficient transcoding rate so as to support, e.g., near-real time transcoding applications.

SUMMARY

The present disclosure addresses the foregoing needs by disclosing, inter alia, apparatus and methods for lightweight data transcoding.

In one aspect, a method of transcoding media data is disclosed. In one embodiment, the media data is encoded according to a first format, and the method includes: (i) performing, using a decoding apparatus, a partial decoding of the media data, the portion to produce intermediate data and undecoded data; (ii) performing at least one transcoding process on the intermediate data to produce transcoded data; and (iii) combining the transcoded data and the undecoded data into a data structure which can then be decoded and rendered by a decoding apparatus according to a second format.

In a second aspect, a method of providing content compatible with a second codec from content encoded with a first codec is disclosed. In one embodiment, the method includes: (i) decoding only a portion of the content encoded with the first codec to produce a decoded content portion and a plurality of undecoded portions; and (ii) processing at least part of the decoded content portion, and combining the processed at least part and the plurality of undecoded portions so as to produce the content compatible with the second codec.

In a third aspect, an apparatus configured to decode content in a first format and encode said content in a second, different format in near-real time is disclosed. In one embodiment, the apparatus includes: data processor apparatus; and storage apparatus in data communication with the data processor apparatus and having at least one computer program disposed thereon, the at least one program being configured to, when executed on the processor apparatus: decode only a portion of the content encoded with the first codec to produce a decoded content portion and a plurality of undecoded portions; process at least part of the decoded content portion to produce a processed portion; and combine the processed portion and the plurality of undecoded portions so as to produce the content compatible with the second codec.

In a fourth aspect, a computer-readable storage apparatus is disclosed. In one embodiment, the computer-readable storage apparatus includes a non-transitory storage medium with at least one program stored thereon. The at least one program is configured to, when executed, decode only a portion of the content encoded with the first codec to produce a decoded content portion and a plurality of undecoded portions; process at least part of the decoded content portion to produce a processed portion; and combine the processed portion and the plurality of undecoded portions so as to produce the content compatible with the second codec.

In a fifth aspect, a computer readable apparatus comprising a storage medium is disclosed. The storage medium is, in one embodiment, configured to store a plurality of data, the plurality of data comprising media data that has a portion that has been transcoded between a first and second encoding format, and a portion which has not been transcoded from the first format to the second format. The plurality of data can be used by a processing apparatus in communication with the computer-readable apparatus to render the media data compliant with the second format.

In a further aspect, a method of providing data encoded according to a first format using apparatus having a configuration not supporting such first format, but supporting a second format, is disclosed. In one embodiment, the method includes: processing a portion of data encoded in the second format relating to a plurality of corresponding features between the first format and the second format, the processing configured to encode the portion according to the first format; and combining the encoded portion and at least one other portion of the data encoded in the second format, the combined encoded portion and at least one other portion being decodable by an apparatus supporting the first format.

In another aspect, a lightweight transcoder apparatus is disclosed. In one embodiment, the apparatus is configured to decode content in a first format and encode the content in a second, different format, and the apparatus is not capable of decoding content rendered in the second format. In one variant, the apparatus includes data processor apparatus and storage apparatus in data communication with the data processor apparatus and having at least one computer program disposed thereon. In one implementation, the at least one program is configured to, when executed on the processor apparatus: decode only a portion of the content encoded with the first codec to produce a decoded content portion and a plurality of undecoded portions; process at least part of the decoded content portion to produce a processed portion; and combine the processed portion and the plurality of undecoded portions so as to produce the content compatible with the second codec.

In another implementation, the at least one program is configured to encode only portions of the decoded content into the second format, such that the resultant media is compatible with the second format, but not fully functioned with respect thereto (i.e., the resultant media is capable of being decoded and rendered by a device configured to utilize the second format, but the decoded and rendered media is not identical (e.g., is lesser in at least one quality or performance aspect) to a version of the media which was completely encoded using the second format.

These and other aspects become apparent when considered in light of the disclosure provided herein.

BRIEF DESCRIPTION OF THE DRAWINGS

FIG. 4 is a diagram illustrating an exemplary embodiment of the simplified approach for modifying H.262 picture blocks to H.264 blocks according to the present disclosure.

FIG. 5 is a diagram illustrating an exemplary H.261/H.262 to H.265 lightweight transcoding scheme according to the present disclosure.

Figure 1:
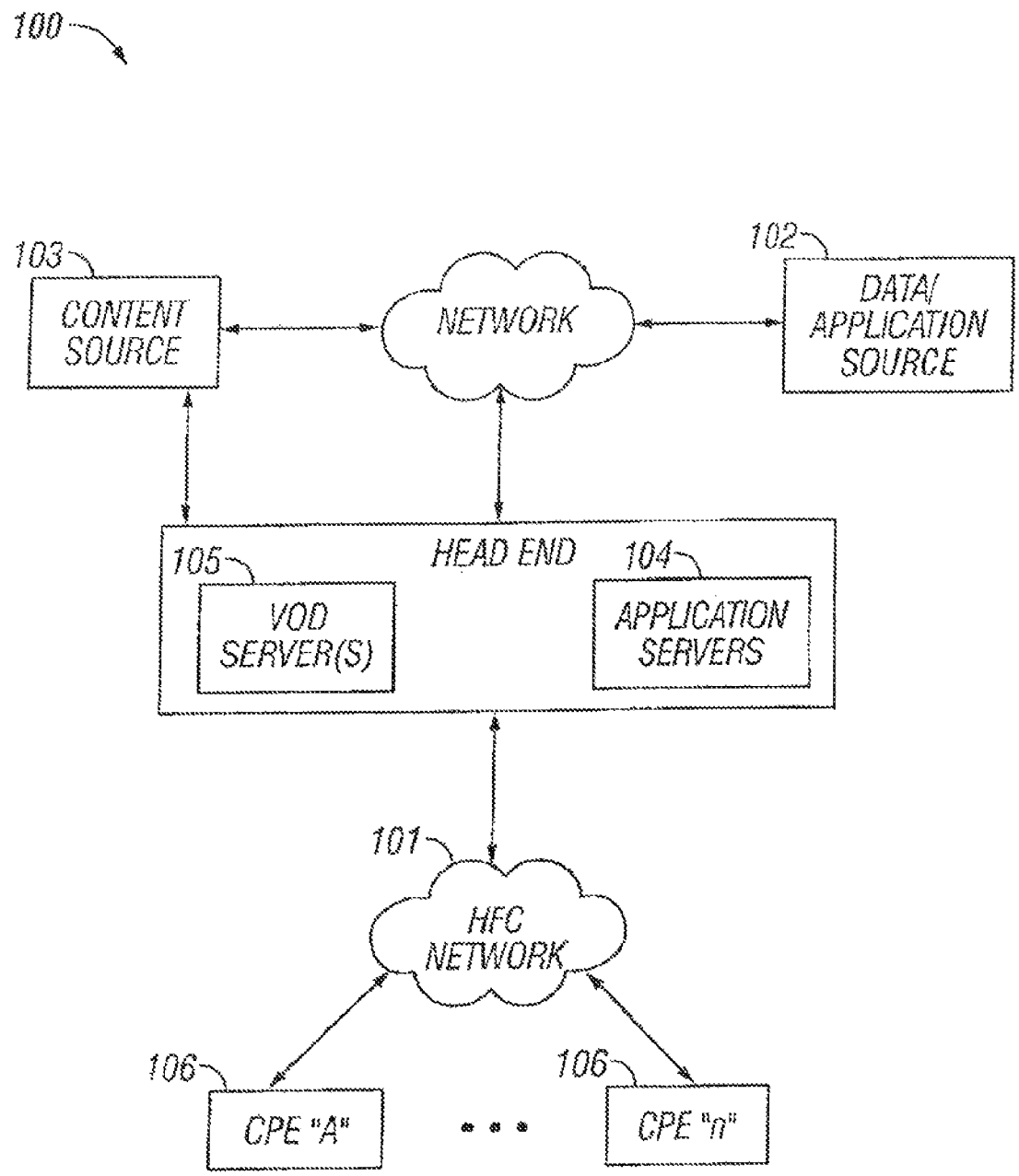
FIG. 1 is a functional block diagram illustrating an exemplary hybrid fiber network configuration useful with various aspects of the present disclosure.

All Figures© Copyright 2014 Time Warner Cable Enterprises LLC. All rights reserved.

DETAILED DESCRIPTION

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "codec" refers to a video, audio, or other data coding and/or decoding algorithm, process or apparatus including, without limitation, those of the MPEG (e.g., MPEG-1, MPEG-2, MPEG-4/H.264/H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the terms "client device" and "user device" include, but are not limited to, set top boxes (e.g., DSTBs), personal computers (PCs), and minicomputers, whether desktop, laptop, or otherwise, and mobile devices such as handheld computers, tablets, "phablets", PDAs, personal media devices (PMDs), and smartphones.

As used herein, the term "computer program" or "software application" is meant to include any sequence or human or machine cognizable steps which perform a function. Such program may be rendered in virtually any programming language or environment including, for example and without limitation, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME. Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IPTV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, OLEDs, incandescent and fluorescent devices. Display devices may also include less dynamic devices such as, for example, printers, e-ink devices, and the like.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer without limitation to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25 Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2, USB 3.0), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (e.g., 802.11a,b,g,n), WiMAX (802.16), PAN (802.15), cellular (e.g., LTE/LTE-A, 3GPP, 3GPP2, UMTS), or IrDA families.

As used herein, the term "server" refers without limitation to any computerized component, system or entity regardless of form which is adapted to provide data, files, applications, content, media, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including inter alia 802.11 a/b/g/n/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, NFC (e.g., ISO 14443A/B), narrowband/FDMA, OFDM, PCS/DCS, LTE/LTE-A/TD-LTE, analog cellular, Zigbee, CDPD, satellite systems, millimeter wave or microwave systems, acoustic, and infrared (i.e., IrDA).

Overview

In one salient aspect, the present disclosure provides apparatus and methods for "lightweight" data transcoding. Specifically, in one exemplary embodiment, a minimal function transcoder for the purposes of, e.g., supporting multiple devices in the home network that require varying video formats, resolutions, or bit-rates, is disclosed. The transcoding functionality may for example be downloaded or otherwise provided (such as via provisioning at the time of install) to an existing device within the home network or at a network edge.

In one embodiment, the transcoder (via various components thereof) uses an intermediate set of audio/video data resulting from a partial decode of an input stream (e.g., (enough to obtain required data to transform or rearrange the previously encoded information) that is temporarily stored until all transformation operations have completed. The partially decoded data is re-encoded and output in any format, resolution, and/or bitrate desired.

In another embodiment, premises networked devices are registered to the lightweight transcoder. The lightweight transcoder may transcode content requested by the registered devices based on any of a number of different events/criteria, such as e.g., (i) upon detection that the registered device is "in use"; (ii) at the time of original content playback or broadcast; and/or (iii) at a time prior to a previously scheduled time of intended use.

Various of the methods and apparatus disclosed herein advantageously exploit the similarities between the mechanisms by which the various encoding formats (e.g., H.261, H.262, H.264, H.265, etc.) account for certain behaviors or artifacts, such as motion compensation, quantization and entropy. In one variant, the lightweight transcoder apparatus merely "ignores" some of the features of the more advanced/complex content formats. The resultant output of the minimal or lightweight transcoder is a "just-in-time" or "near real-time" transcoded content for use in a premises network comprising non-legacy (such as IP-enabled) client devices with the more advanced codecs.

The exemplary embodiment of the disclosed lightweight transcoder apparatus utilizes extant software-based processing capability to "fit" data of a first format into a second format in a time-efficient manner (e.g., in near-real time). In doing so, the lightweight transcoder surrenders traditional goals of obtaining the best compression or highest quality output in an effort to simply create the desired format content stream with an acceptable level of quality/compression, and using non-application specific hardware (e.g., ASICs particularly configured to decode/transcode).

Detailed Description of Exemplary Embodiments

Exemplary embodiments of the apparatus and methods of the present disclosure are now described in detail. While these exemplary embodiments are described in the context of a managed content distribution network (e.g., hybrid fiber coax (HFC) cable) architecture having a multiple systems operator, digital networking capability, and plurality of client devices/CPE, the general principles and advantages of the disclosure may be extended to other types of networks, architectures and applications, whether broadband, narrowband, wired or wireless, terrestrial or satellite, managed or unmanaged (or combinations thereof), or otherwise, the following therefore being merely exemplary in nature.

It will also be appreciated that while described generally in the context of point-to-point IP-based content delivery (e.g. IP video delivery or streaming), the present disclosure may be readily adapted to other types of IP-based delivery (e.g., IP-based content multicasts, etc.) as well. A myriad of other applications are possible.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Bearer Network—

FIG. 1 illustrates a typical content delivery network configuration useful for delivery of encoded content according to the present disclosure. The various components of the network 100 include: (i) one or more data and application origination points 102; (ii) one or more content sources 103; (iii) one or more application distribution servers 104; (iv) one or more VOD servers 105; and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g.. RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Content (e.g., audio, video, data, files, etc.) is provided in to the client devices 106 in a given data format (e.g., MPEG-2, MPEG-4, etc.). To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

Figure 1A:
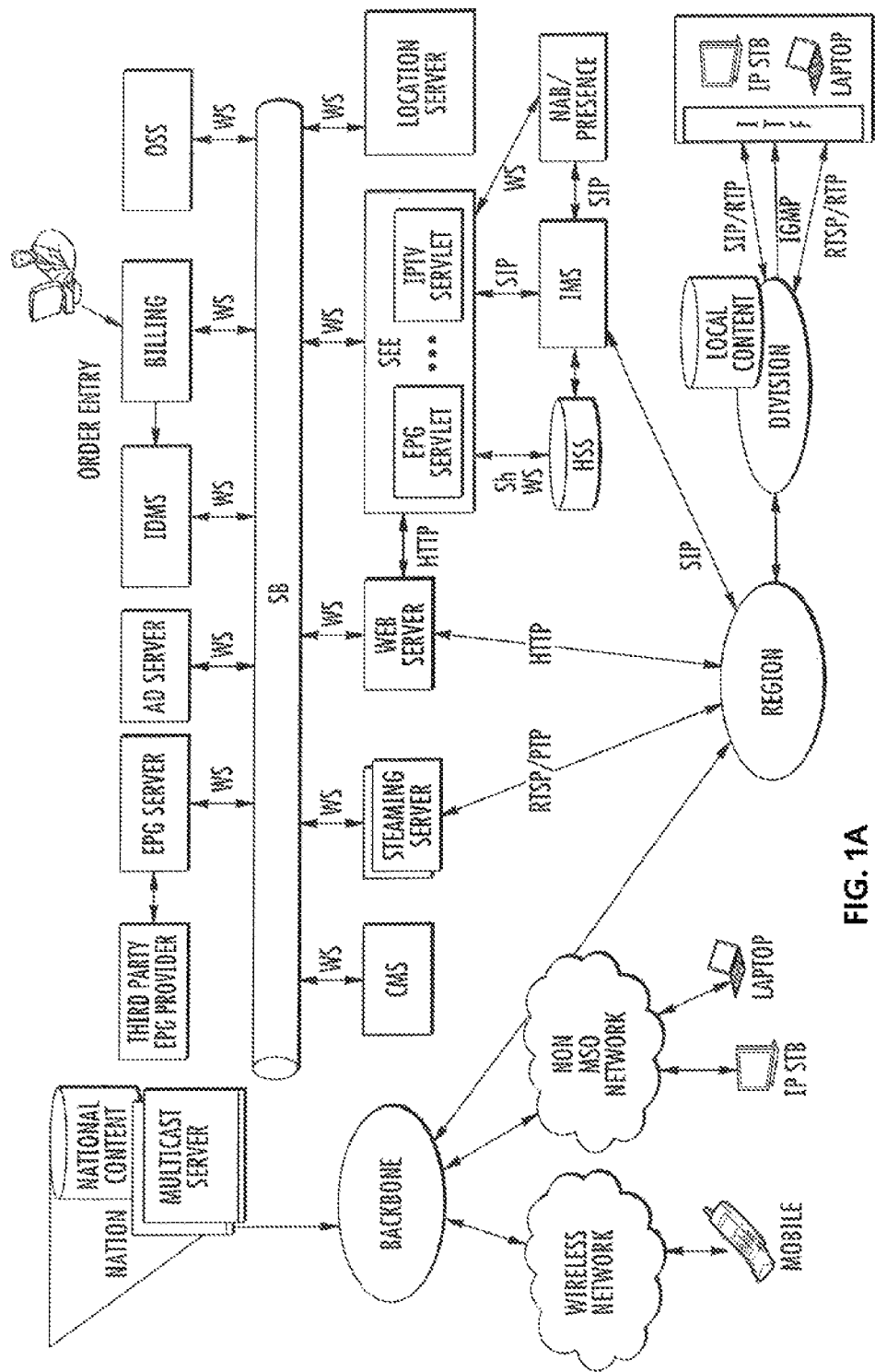
FIG. 1A is a functional block diagram illustrating one exemplary embodiment of a packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for delivery of the packetized content (e.g., encoded content). FIG. 1A illustrates one exemplary implementation of such a network, in the context of a 3GPP IMS (IP Multimedia Subsystem) network with common control plane and service delivery platform (SDP), as described in co-owned U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which claims priority to U.S. Provisional Patent Application Ser. No. 61/256,903 filed Oct. 30, 2009, and which is now published as U.S. Patent Application Publication No. 2011/0103374, each of which is incorporated herein by reference in its entirety.

As discussed therein, a substantially session-based and packetized content delivery approach (e.g., using the well known Internet Protocol) which allows for temporal, device, and location flexibility in the delivery of the content, and transportability/migration of user sessions, as well as service/content personalization (e.g., on a per-session/user basis) and blending (integration) is provided. This approach uses a common or unified delivery architecture in providing what were heretofore heterogeneous services supplied by substantially different, and often vendor-specific, networks. Moreover, the foregoing improved apparatus and methods provide for enhanced content access, reproduction, and distribution control (via e.g., a DRM-based approach and other security and content control measures), as well as quality-of-service (QoS) guarantees which maintain high media quality and user experience, especially when compared to prior art "Internet TV" paradigms. In another implementation, the network comprises both "managed" and "unmanaged" (or off-network) services, so that a network operator can utilize both its own and external infrastructure to provide content delivery to its subscribers in various locations and use cases. In one variant of this approach, network services are sent "over the top" of other provider's infrastructure, thereby making the service network substantially network-agnostic.

In another variant, a cooperative approach between providers is utilized, so that features or capabilities present in one provider's network (e.g., authentication of mobile devices) can be leveraged by another provider operating in cooperation therewith. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Notwithstanding the foregoing, it will be appreciated that the various aspects and functionalities of the present disclosure are effectively agnostic to the bearer network architecture or medium, and hence literally any type of delivery mechanism can be utilized consistent with the disclosure provided herein.

Lightweight Transcoding Architecture—

Figure 2:
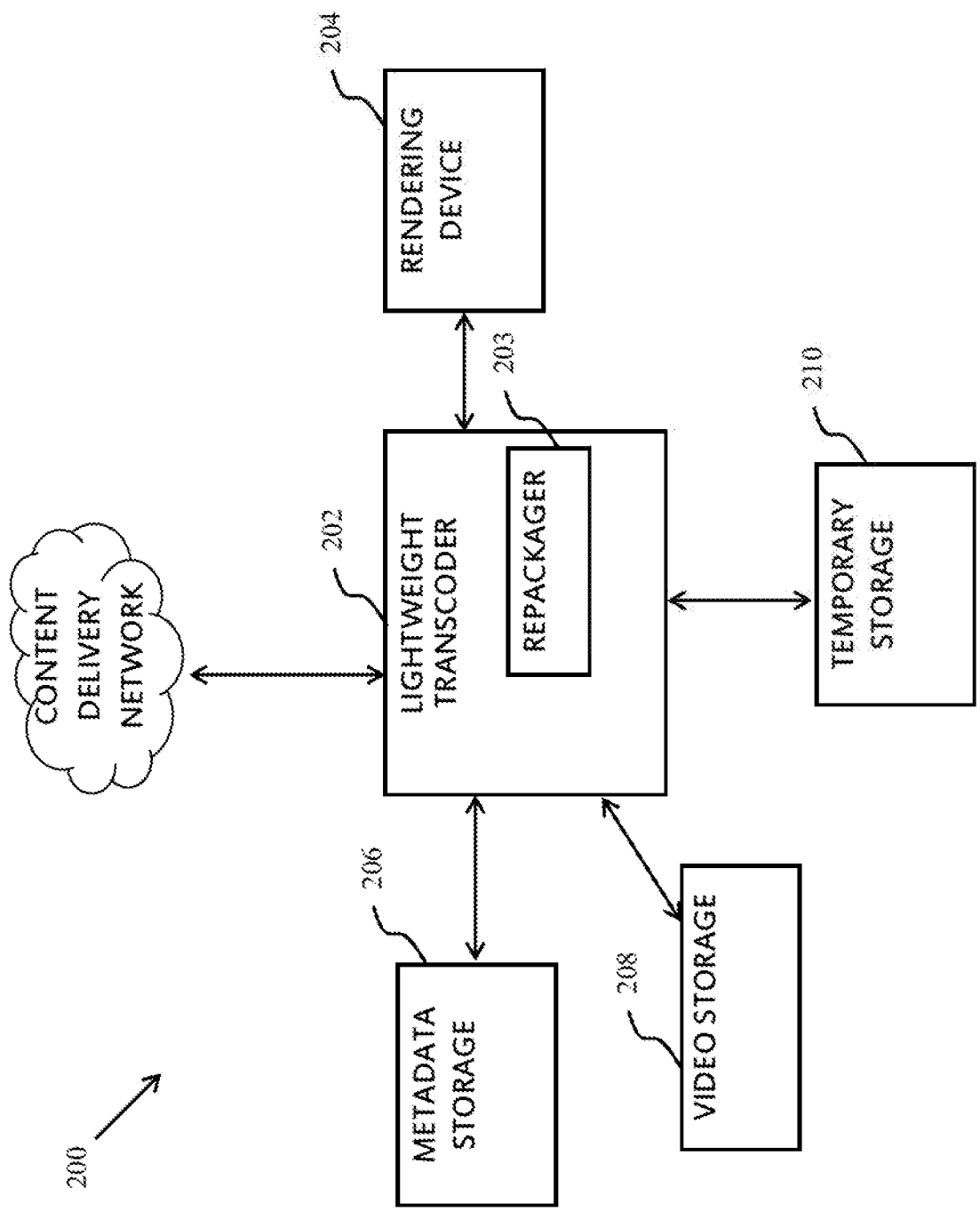
FIG. 2 is a functional block diagram illustrating one exemplary embodiment of a network architecture for providing lightweight transcoding according to the present disclosure.

FIG. 2 illustrates an exemplary embodiment of a network architecture 200 for providing lightweight transcoding according to the present disclosure. The network 200 of FIG. 2 is utilized to receive content and transcode the content from the format it is received in, into a different format, based on e.g., the capabilities of the devices in the network 200 which will render the content. The rendering device 204 capabilities may relate to for example, video formats, codecs (e.g., H.264/.265), resolutions, and/or available bit-rates for communications between the transcoding apparatus and the rendering device.

The exemplary illustrated network entities and apparatus are configured to operate within one or more of various the above-described bearer networks of FIGS. 1-1A, although others may readily be used. The network may be based on wireless and/or wireline networking technologies (e.g., Wi-Fi family 802.11, WiMAX 802.16, wired Ethernet standards (802.3), optical standards/paradigms such as FIOS, SONET, etc.). The technologies forming the bearer networks may also range in scope from PAN (personal area networking), "mesh" networking, to nationwide or even global architectures). It will also be appreciated that bridges may be used to create a hybrid network environment using multiple ones of such technologies (e.g. cellular or Wi-Fi wireless/wired Ethernet hybrid).

As shown, the network 200 generally comprises a lightweight transcoder entity 202 which receives content from a content distribution or delivery network (such as the network disclosed in FIGS. 1-1A) and which is in data communication with at least metadata storage 206, video storage 208, and temporary storage 210. The transcoder entity 202 is further in communication with one or more rendering devices 204.

The transcoder 202 and/or storage devices (metadata storage 206, video storage 208, and/or temporary storage 210) may comprise premises network devices or may be located at a network edge or other location in communication with the customer's premises. In one variant, a user registers each of the user's rendering devices 204 to the transcoder 202. The user may do so by placing these in communication with the transcoder 202 and, via a series of message exchanges between the devices establish that the user of the rendering device 204 is a subscriber to the content delivery network and a user of the device 204. The user may register more than one rendering device 204 (FIG. 2 being merely exemplary of the overall system); in this case, the devices and/or user will also establish that particular user as being the same user across the various devices. During the registration process, the transcoder 202 is further made aware of the capabilities of each of the rendering devices 204 via generation of a device profile for each rendering device and/or a home network profile for each subscriber or user. In the instance that the transcoder 202 comprises a network edge device (i.e., is not located at the consumer's premises), the transcoder 202 is further configured to associate each rendering device with a particular one of the users/subscribers which may also register their devices to the transcoder 202.

The rendering devices 204 comprise any device capable of receiving, decoding and displaying (or communicating decoded data to a device configured to display) audio/video content. Exemplary rendering devices include IP-enabled devices such as smart phones, tablet computers, hand held computers, laptop computers, personal computers, smart televisions, streaming media devices, etc., as well as non-IP enabled set top boxes, etc. The present disclosure is intended to provide functionality irrespective of the specific formats with which the rendering devices are compatible.

As will be discussed in greater detail below, the transcoder 202 (also referred to herein as the "lightweight transcoder") is configured to receive content delivered from the content delivery network. As noted above, content is, in one embodiment, delivered in H.261 or H.262 format; the content may be either live or previously recorded and may delivered as a broadcast, multicast, or unicast. Additionally, the rendering devices 204 within the home network require, in one embodiment, H.264 video format. It is appreciated, however, that the herein described approach may be utilized for conversion between any data formats; H.262 to H.264 conversion being merely exemplary of the general process.

The transcoding process occurs in either hardware or software the transcoder device 202. The transcoder device 202 may comprise a premises apparatus (such as a set top box, gateway device, or other CPE), or a network or network edge device (e.g., a server processor in a network operations center). In one variant, since the transcoding process discussed herein is "lightweight", the process may comprise a downloadable software upgrade provided via another network entity and may utilize substantially extant device hardware. In one specific example, MPEG2 video content arrives in a QAM or Ethernet port, and is transcoded to MPEG4 over HTTP Live Steaming (HLS) to an Apple iPad® on the same home network as the transcoding device 202.

The lightweight transcoder 202 receives data and, irrespective of the input format, metadata associated to the received data is stored at the metadata storage 206 entity. If the data it is in an appropriate format for the home network (e.g., H.264), a copy of the data is immediately stored at the video storage apparatus 208. If the received data is not in an appropriate format for the home network, the data input is partially decoded, then the partially decoded discrete cosine transforms (DCTs) which constitute the data are either stored onto a disk at the temporary storage entity 210, or are immediately re-mapped to DCTs of a particular format. The format selected for re-encoding may be a format previously selected by the requesting user or may be selected based on the device and/or user profile (e.g., based on the compatibility of the requesting rendering device 204). The re-mapped DCT may be recorded to temporary storage 210 or may be immediately repackaged into the new format's packaging. Once repackaged, the data is recorded in its new format to storage (at the storage apparatus 208) for later consumption, or is sent to a rendering device 204 for audio/video display via a backend interface of the transcoder 202 (e.g., MoCA, Ethernet, WiFi, etc.) based on a request for the content being received from the rendering device 204.

The intermediate or temporary storage entity 210 may be of sufficient size to accommodate data storage during the transformation process. In one variant, a storage entity of large enough to enable time-shifting for twice the amount of time required for all transformation operations for a given device to be completed is utilized.

A typical premises networks may utilize up to Gigabit speed Ethernet services. Hence, transcoding and delivery of the transcoded content from an in home transcoder 202 to a rendering device 204 in the premises network may approximate real-time. In other words, the present disclosure provides a mechanism for transcoding content at a rate which is 1.5-3 times faster than traditional transcoding rates. As will be discussed in greater detail below, the present mechanism accomplishes this goal by circumventing various traditional transcoding steps to arrive at a lower quality, less efficiently transcoded content. For example, when converting H.262 to H.264 it may be ignored that the H.264 format is capable of having multiple reference frames, spatial prediction, and varying block sizes. In so much as these features are not strictly "required" to generate H.264 format data, they are simply skipped, i.e., the re-encoded data does not take advantage of these features. The same logic is applied in conversion between other data formats. A salient difference between the present disclosure and typical transcoding systems is that in the present disclosure the ability to transcode in near-real time or near-live and stream within a home for alternate screen devices is taken to outweigh the excess bandwidth consumption needed to support multiple simultaneous devices and/or profiles and the reduced quality of the transcode (as being less than best possible class).

In another variant, the present disclosure takes advantage of secure read/write functions available within the operating systems of existing premises devices, including a premises located transcoder 202 and/or the rendering devices 204. In this manner, a network operator may define the read and/or write access of the various devices (transcoder 202, rendering device 204, etc.) with respect to given a content or content type, or generally with respect to all content. Specifically, Conditional Access is controlled by a hardware device called a cable card or other secure micro device. The secure micro device stores the list of entitlements on behalf of the subscriber. These entitlements control access to premium channels, pay-per-view services, and system resources such as the hard disk drive used for digital video recording. In one embodiment, the hard disk drive is used to store partially decoded sections for transcoding and/or remapping as discussed herein. This temporary storage must be conditionally accessed to be in full support of copy protection within the device. The entitlement agent within the CPE thus verifies the ability to use the disk and provide the open/read/write/close method capability. Data written and subsequently read will have been encoded and decoded via these write/read methods. In an alternative embodiment, other means for controlling access may be utilized such as, e.g., Digital Rights Management (DRM).

The lightweight transcoder 202 may transcode content requested by the registered devices in at least one of the following instances: (i) upon detection that the registered device is "in use"; (ii) at the time of original content playback or broadcast; and/or (iii) at a time prior to a previously scheduled time of intended use.

In the first instance, the registered user devices 204 which are capable of rendering content are configured to automatically signal to the transcoder 202 when they have been powered on and/or have entered a home network. Any content requested by these devices is then automatically transcoded for delivery to the devices via the premises network. Alternatively, the transcoder 202 may periodically send a heartbeat message to which the rendering devices 204 in the network respond. When a new device enters the network and/or is powered on, the transcoder 202 is made aware of its presence and may begin transcoding content which is requested to be received thereat.

In the second instance, the transcoder will select particular content to be automatically transcoded at the time it is broadcast (irrespective of a request) and/or at the time it is requested to be rendered. Requests for particular content may be received simultaneous to a broadcast of the content, or after a broadcast of the content (in this instance the content is delivered from video storage 208 or temporary storage 210). The content selected to be automatically transcoded at the time it is broadcast according to this embodiment may comprise content which is determined to have a high viewership rate among most subscribers, content which is previously identified by the subscriber to be of particular interest, content which is concurrently being requested or recorded at another device associated to the subscriber, and/or content which is identified as being of particular interest to a subscriber based on a profile associated thereto. An exemplary mechanism for determining a user profile and providing content recommendations is disclosed in co-owned, co-pending U.S. patent application Ser. No. 12/414,576 entitled "RECOMMENDATION ENGINE APPARATUS AND METHODS" and filed on Mar. 30, 2009, which is incorporated herein by reference in its entirety. As discussed therein, a mechanism for particularly selecting content to align with a user's preferences (which the viewer need not enter manually) is provided. The content provided to the user is compiled from various distinct sources, including, inter alia, DVR, broadcasts, VOD systems, start over systems, etc. The present invention provides a mechanism to learn (and unlearn) the user's preferences and which content they are likely to enjoy based on actions taken with regard to the content. The recommended content may then be transcoded and/or recorded to temporary storage 210 for transcoding at a later time.

In the third instance, the requesting rendering device 204 may pre-establish a time at which content is intended to be displayed. Given the speed at which the presently disclosed lightweight transcoder 202 is configured to transcode, the pre-established time may be as early as a portion of a second past its live broadcast time. According to this embodiment, the subscriber merely schedules a particular content in advance via a scheduler function of the transcoder apparatus 202. The scheduler enables the subscriber to identify the requested content as well as a time for delivery thereof. The transcoder 202 uses this information to arrange resources to be available to transcode the particular content in advance of the scheduled time for delivery thereof. The transcoder 202 may further use what is known about a time needed to transcode the entirety of the content to determine an adequate time to begin the transcoding process so as not to interrupt delivery there of to the subscriber.

Exemplary Lightweight Transcoding—

Figure 3:
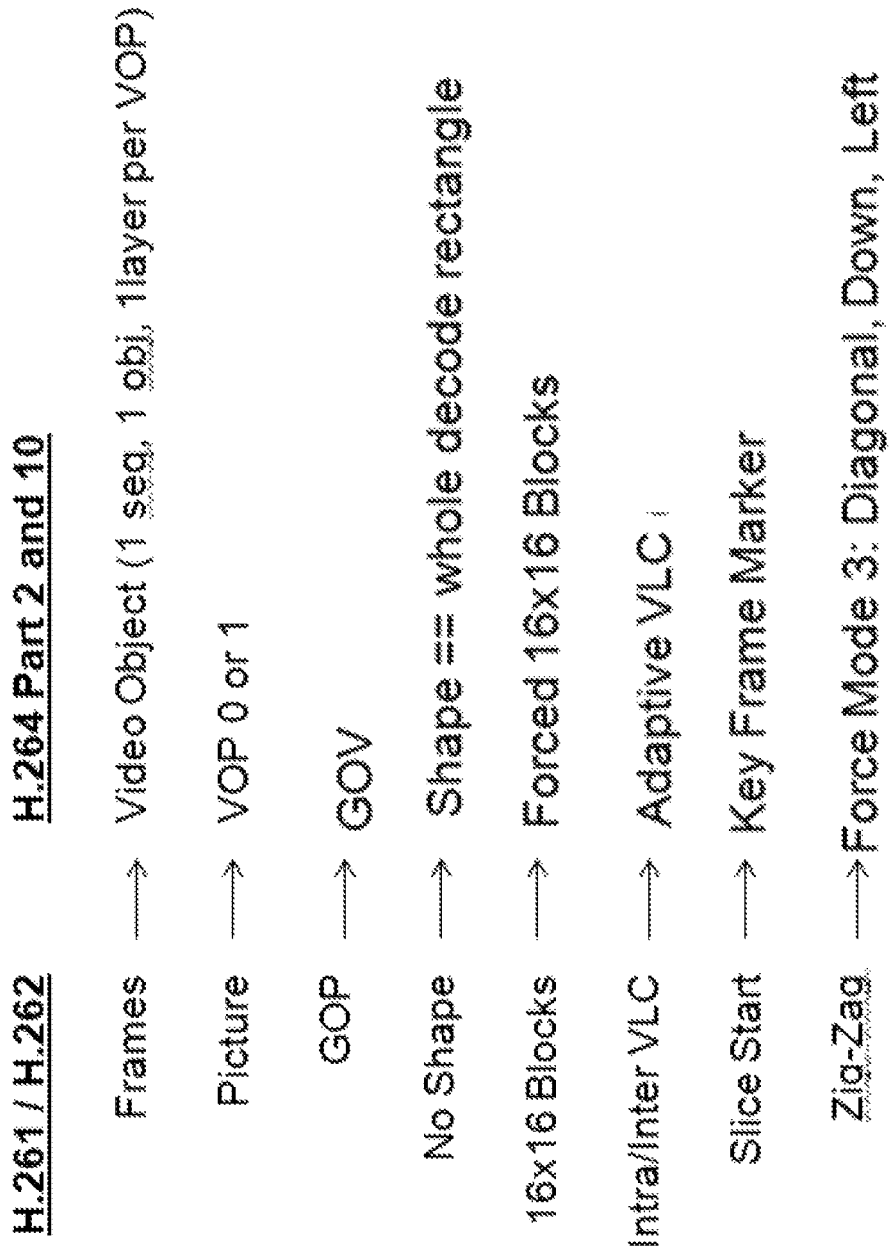
FIG. 3 is a diagram illustrating an exemplary H261/H.262 to H.264 lightweight transcoding scheme according to the present disclosure.
Figure 4:
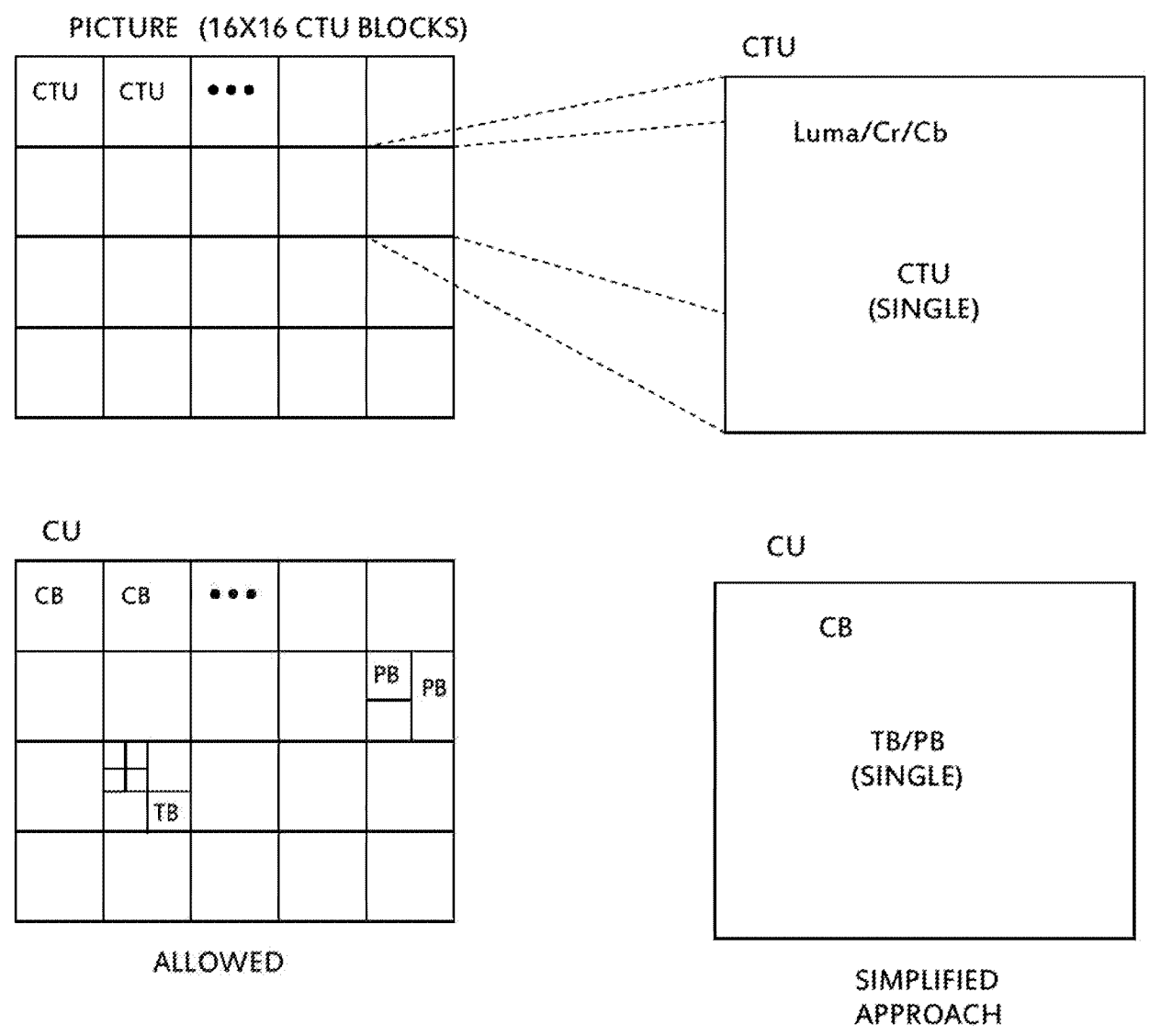

FIGS. 3-5 illustrate exemplary lightweight transcoding according to the present disclosure. The illustrated embodiments are exemplary of the general principles of the disclosure and are in no way intended to limit the scope thereof.

The exemplary transcoding schemes of FIGS. 3-5 are, in one embodiment, performed at a processor associated to the lightweight transcoder apparatus 202. As noted above, software for performing the herein described transcoding may be downloaded or otherwise provided to the transcoding device 202 thereby taking advantage of the device's indigenous hardware capabilities.

In the illustrated embodiments, each data element in a first format is re-used in generating the data in the second format. However, a loss of some frames may be tolerable given the nature of the present disclosure to forego certain quality requirements in an effort to ensure overall readability of the content in the transcoded format.

The data elements are re-used by repackaging them from a first encoding standard object to a standard object of the second encoding scheme. As will be discussed in detail herein, removing a header portion of the data and replacing it with a header particular to the desired codec may, in many instances, be sufficient to perform the lightweight transcoding discussed herein. The present disclosure purposely does not take advantage of some of the advancements that are available to "higher" codec content formats so as to arrive at a transcoded content version more quickly than would be ordinarily obtainable. However, in other embodiments, various ones of these advancements may be utilized during the lightweight transcoding process to address specific desired results, such as e.g., taking advantage of a higher codec's multilevel capabilities to arrive at a transcoded content which is smaller in size (thus easier to store) than would be obtained without the multilevel transcoding.

FIG. 3 illustrates a high-level diagram of one exemplary H.261/H.262 to H.264 lightweight transcoding scheme. As shown, the lightweight transcoder 202 repackages each frame in H.261/H.262 to a single sequence, single object, single layer video object in H.264. As will be discussed in greater detail below, although H.264 is configured to utilize a more complex video object, the mere categorization from frames in H.261/H.262 to video objects in H.264 is sufficient to enable the frames to be rendered by an H.264 device.

Each picture in H.261/H.262 is repackaged into video object plane (VOP) background (i.e., layer 0). Given that there is no additional repackaging required for utilizing layer 0 in H.264, using this layer eliminates any prediction between planes. A group of pictures (GOP) in H.261/H.262 is repackaged as a group of video objects (GOV) in H.264. Specifically, the GOV in the H.264 stream is substantially similar to a GOP in H.262 in that it holds the frame sequence (e.g. IBBPBBPBBP), the difference being the sequence describes VOPs rather than frames. Given that different VOPs are not being created from the H.262 stream (because the present disclosure operates in a single layer) the I, B, and P frames are simply set to I, B, and P VOPs (within VOP layer 0). Rather than taking advantage of the H.264 ability to define various shapes, the H.261/H.262 data is assigned a rectangle. The H.264 rendering device will then decode the entire rectangle to obtain the data.

The 16×16 blocks utilized in H.261/H.262 are, in one embodiment, forced into the H.264 standard. FIG. 4 illustrates and exemplary embodiment of the simplified approach for modifying H.262 picture blocks to H.264 blocks according to the present disclosure. It is appreciated that H.262 uses a fixed 16×16 block for luma DCTs, an 8×8 block for chroma DCTs, and a 16×16 block for motion estimation. The H.264 offers more coding options by supporting variable block size prediction for inter as well as intra block coding. The intra prediction modes can use 16×16 or 4×4 block sizes (8×8 block size can also be used optionally). The DCT blocks recovered from the MPEG-2 partial decoding stage are used to estimate the prediction modes of DCT blocks in H.264. To accomplish this, the header bits for 'frame_mbs_only_flag' and 'direct_8×8_inference_flag' are set to 1.

The intra/inter variable length coding (VLC) of the H.261/H.262 format is translated to adaptive VLC. As will be discussed in greater detail below, H.264 provides for two types of entropy encoding, context-adaptive binary arithmetic coding (CABAC) and context-adaptive variable length coding (CAVLC). CAVLC is always selected in the case of H.264 and CABAC must be selected in the case of H.265. Translation is accomplished, in one embodiment, by decoding the VLC in H.262 to obtain the DCT coefficients to be used in the (re)transformation activity while moving to either H.264 or H.265 output. This activity is followed by re-encoding to either CAVLC (in the case of H.264) or CABAC (for H.265).

The slice start structure of H.261/H.262 is repackaged to fit the key frame marker structure of H.264. To accomplish this, in one embodiment, the H.264 slice type header field is set to 7 (I-VOP) for each H.262 I-frame processed (this is the key frame marker).

Finally, the zig-zag mode in H.261/H.262 can be forced to H.264 Mode 3 using a diagonal, down, then left pattern. This may be accomplished by rewriting the bits of the zig-zag mode. In one embodiment, this is accomplished by setting the H.264 slice entropy coding mode header field to three (diagonal down left) for each H.262 slice processed.

Referring now to FIG. 5, a high-level diagram of one exemplary H.261/H.262 to H.265 lightweight transcoding scheme is illustrated. According to this embodiment, the lightweight transcoder 202 repackages each frame in H.261/H.262 to a single sequence, single object, single layer video object in H.265. As will be discussed elsewhere herein, the H.265 standard utilizes a more complex video object; the present disclosure provides a mechanism to enable the frames to be rendered by an H.264 device without taking advantage of the specific complexities of H.265.

Each picture in H.265 is repackaged into the video object plane (VOP) via its plane 0 or background plane (similar to that discussed above for H.264 repackaging). A group of pictures (GOP) in H.261/H.262 is repackaged as a group of video objects (GOV) in H.265. The GOV in the H.265 stream is essentially the same as a GOP in H.262 in that it holds the frame sequence (e.g. IBBPBBPBBP), the difference is that the sequence describes VOPs rather than frames. The present disclosure does not create different VOPs from the H.262 stream when repackaging as H.265, instead the I, B, and P frames are set to I, B, and P VOPs (within VOP layer 0). The H.261/H.262 data is assigned a rectangle rather than taking advantage of the H.265 ability to define various shapes. The H.265 rendering device simply decodes the entire rectangle to render the data.

The 16×16 blocks utilized in H.261/H.262 are, in one embodiment, forced into fixed size Transform Units to simple Coding Tree Units (CTU) in the H.265 standard.

The intra/inter variable length coding (VLC) of the H.261/H.262 format is transitioned to context-adaptive binary arithmetic coding (CABAC) in H.265. This is accomplished by, in one embodiment, decoding the VLC in H.262 to obtain the DCT coefficients to be used in the (re) transformation activity while moving the H.265 output. This activity is followed by re-encoding to CABAC (for H.265).

The slice start structure of H.261/H.262 is repackaged to fit the key frame marker or tile marker structure of H.265. Since the NAL header fields are backward compatible to H.264 the slice type is set to 7 (I-VOP) for each H.262 I-frame processed (this is the key frame marker).

Finally, the zig-zag mode in H.261/H.262 can be forced to H.265 Mode 3 using a diagonal, down, then left pattern. This may be accomplished by rewriting the bits of the zig-zag mode. In other words, since the NAL header fields are backward compatible to H.264 the slice entropy coding mode header field will be set to 3 (diagonal down left) for each H.262 slice processed.

The foregoing lightweight transcoding schemes of FIGS. 3-5 improve the speed of encoding such that content may be transcoded in near real time. That is, although there is some delay associated with the in-bound quality and available bandwidth, there is generally an undetectable delay associated to the lightweight transcoding process itself. A delay associated with the transcoding process may be detectable in the instance the transcoded section comprises e.g., a high bandwidth scene or portion of content. In one embodiment, the delay period associated with the in-bound quality, bandwidth availability, and/or bitrate requirements of the transcoded content itself may be accounted for in advance.

In one variant, delivery of the transcoded content stream may be delayed by an amount of time equal to an amount of time necessary to account for the so-called "worst case scenario", i.e., an instance of highest delay due to one or more of in-bound quality, bandwidth availability, bitrate requirements of the transcoded content itself, and/or other factors effecting transcoding speed.

In another variant, an upstream network entity or the transcoder 202 itself may be configured to pre-scan content to determine portions which have high bitrate requirements. These portions may be utilized to determine an amount of delay (as discussed above) and/or for pre-processing and mapping. In other words, a network entity (or the transcoder 202) may review selected content to determine high bandwidth portions, instructions or a map are given to the transcoder process to provide a time at which it is determined the delay would not be detectable by a subscriber and/or the rendering device during streaming of the transcoded content.

Exemplary Methods—

Figure 6:
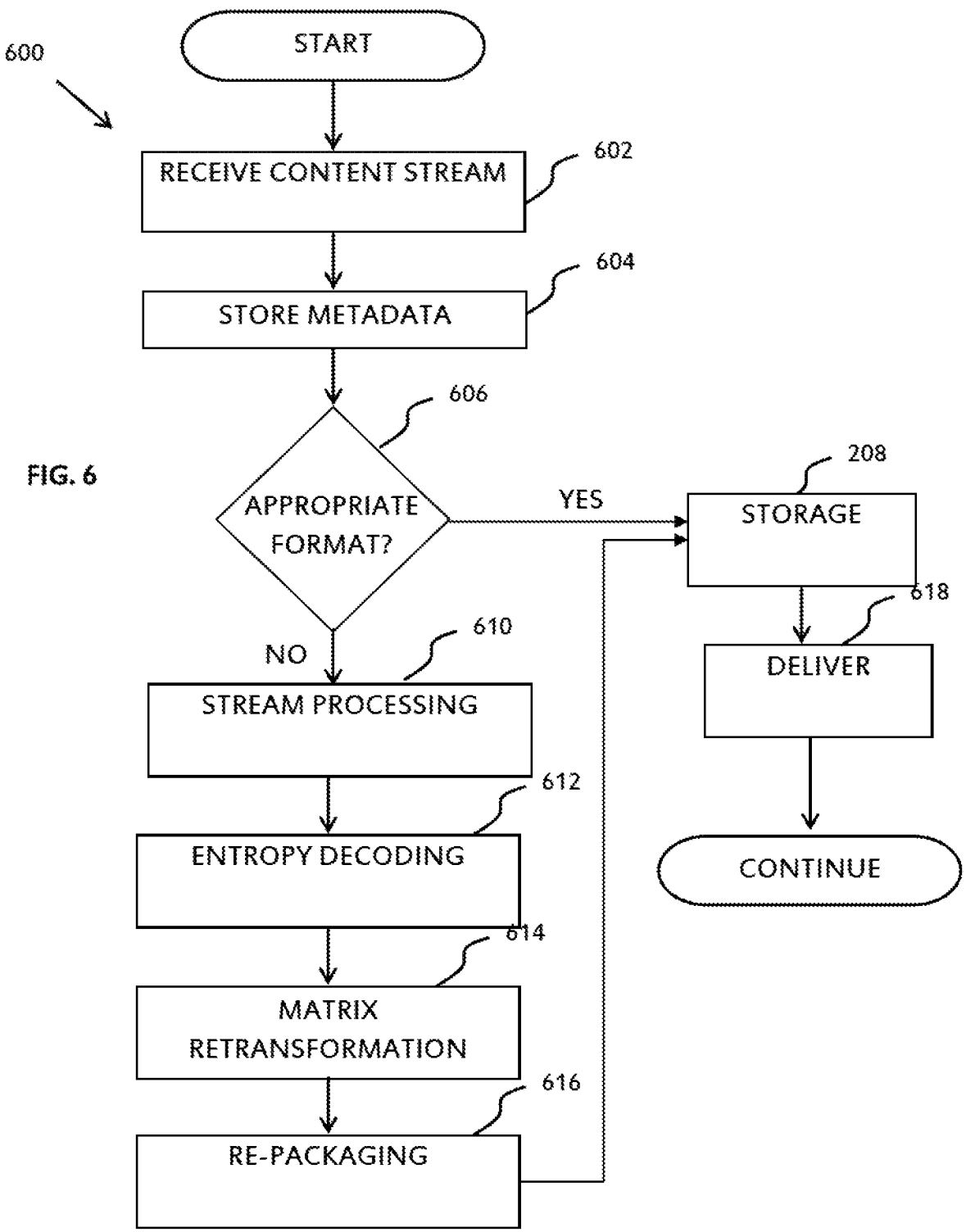
FIG. 6 is a logical flow diagram illustrating an exemplary method for performing lightweight transcoding according to the present disclosure.

Referring now to FIG. 6, an exemplary method 600 for performing lightweight transcoding according to the present disclosure is given. As shown, the method 600 generally comprises receiving a content stream (step 602). The content stream may be received at a lightweight transcoder 202 which may be located at a user premises or elsewhere in the network, including e.g., the network edge. Per step 604, metadata associated with the received content is stored at the metadata storage entity 206. At step 606, the transcoder 202 determines whether the received content is in an appropriate format based on what is known about the subscriber network devices registered to the transcoder 202. The transcoder 202 may make this decision based on e.g., the capabilities of a rendering device 204 which requested the content and/or other devices which are known to be in the network (i.e., other registered devices). In another variant, the transcoder 202 may be given a pre-configured set of rules for transcoding either entered by the subscriber or by a network operator. For example, it may be specified that all content which is to be stored at the video storage 208 be in a specific format (e.g., H.264). In another example, it may be that only content for which a current request form a rendering device has been received is to be transcoded, while all other content is stored as is in the video storage 208.

When it is determined that the content is in an appropriate format based on the capabilities of the devices which have requested the content or are in the network and/or the aforementioned rules, the content is placed in video storage 208. When it is determined that the content is not in an appropriate format, the content is partially decoded via stream processing (step 610), entropy decoding (step 612), and matrix retransformation (step 614), then repackaged (step 616) and placed in storage 208. The stream processing (step 610), entropy decoding (step 612), matrix retransformation (step 614), and repackaging (step 616) will be discussed in greater detail below with respect to FIGS. 6a-6e.

In an alternative embodiment, an intermediary device may be provided either at the network edge or within the user's premises which initially receives and evaluates the content stream. For example, a premises gateway apparatus may be disposed between the network and the premises transcoder 202. In this instance it is the gateway (or other intermediary entity) which causes the metadata relating to the received content to be stored (step 604), determines whether the received content is in an appropriate format (step 606) and directs the content to video storage 208 or to be partially decoded (steps 610-616).

In one variant, content is held in temporary storage 210 prior to being transcoded to one or more new formats. The formats to which content are to be repackaged into using the lightweight repackaging solutions discussed herein are determined based on e.g., the capabilities of a requesting device, the capabilities of all of the devices associated or registered to the subscriber, and/or one or more user or network-established rules for transcoding. Accordingly, particular content may be transcoded into more than one new format to accommodate the capabilities of all of the devices within the network. Alternatively, a single format may be selected for use within the premises network, and the particular content is repackaged to only that format. Exemplary repackaging techniques which may be utilized to transform from H.261/H.262 to H.264 or H.265 are discussed elsewhere herein and may be used with equal success in accordance with the method of FIG. 6.

The one or more transcoded content versions are then placed in video storage 208 alongside the content which was received already in the appropriate format (discussed above). In this manner, the system creates a video storage 208 having only content which can be delivered to requesting devices. Stated differently, all content which is received in an inappropriate format is only temporarily stored then saved to more permanent storage upon transcoding thereof.

Finally, at step 618, content which was placed in the video storage 208 is delivered to a rendering device 204. The delivery may occur at a time of request thereof by the rendering device 204 or may be pre-scheduled by the rendering device 204 (or other device on behalf of the rendering device).

As noted elsewhere herein, the disclosed method 600 may be performed on live broadcast content which is streamed to the transcoder 202 for immediate repackaging and delivery of the content in near real-time.

Figure 6A:
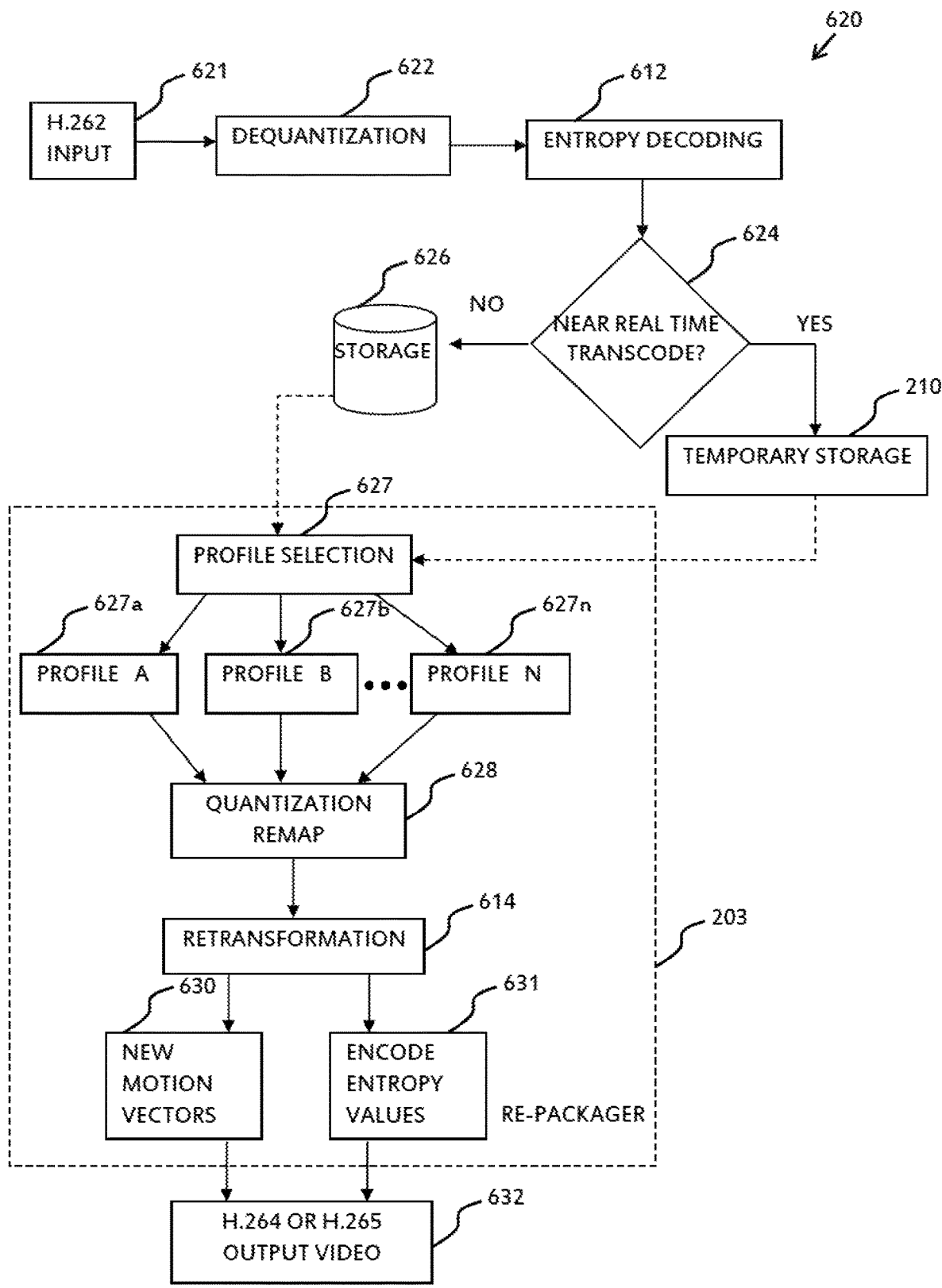
FIG. 6a is a logical flow diagram illustrating an exemplary method for providing lightweight transcoding according to the present disclosure.

Referring now to FIG. 6a, a specific variant of an exemplary method 620 for performing lightweight transcoding according to the present disclosure is given. As shown, the method generally comprises receiving an H.262 input at step 621. It is appreciated however, that the input signal may comprise an H.261 input in another alterative embodiment. The input stream is first processed including e.g., dequantization (step 622) such that the nonlinear signals are reconstructed. This may occur using e.g., smooth and/or step signal reconstruction. Alternative mechanisms for dequantization which are well known in the art may also be utilized.

Entropy decoding is applied to the dequantized stream (step 612). As will be discussed in further detail elsewhere herein (see e.g., FIG. 6c and discussion relating thereto), entropy decoding may include translation to obtain DCT coefficients which are later used for re-encoding according to either CAVLC or CABAC.

At step 624 it is determined whether the content is to be transcoded (via the lightweight transcoder) in so-called near real time. In the instance, the content is not required to be transcoded immediately (i.e., transcoding is deferred) it is placed in storage at step 626. The storage entity used for deferred transcoding may comprise the temporary storage 210, video storage 208, and/or another storage entity (not shown). Content which is to be transcoded in near real time is placed in temporary storage 210.

At the time determined to begin transcoding (either in near real time or at some deferred time), a profile is selected (per step 627) to correspond to the appropriate device and/or user. In the illustrated example, Profile A 627a, Profile B 627b, through Profile N 267n may be selected. Once the appropriate profile is selected, a quantization remapping is performed (step 628) to process the signal in preparation for retransformation (step 614), which will be discussed in further detail below.

Finally repackaging of the stream is performed which may include adding new motion vectors 630 and encoding new entropy values 631 to create an H.264 or H.265 output at step 632.

Figure 6B:
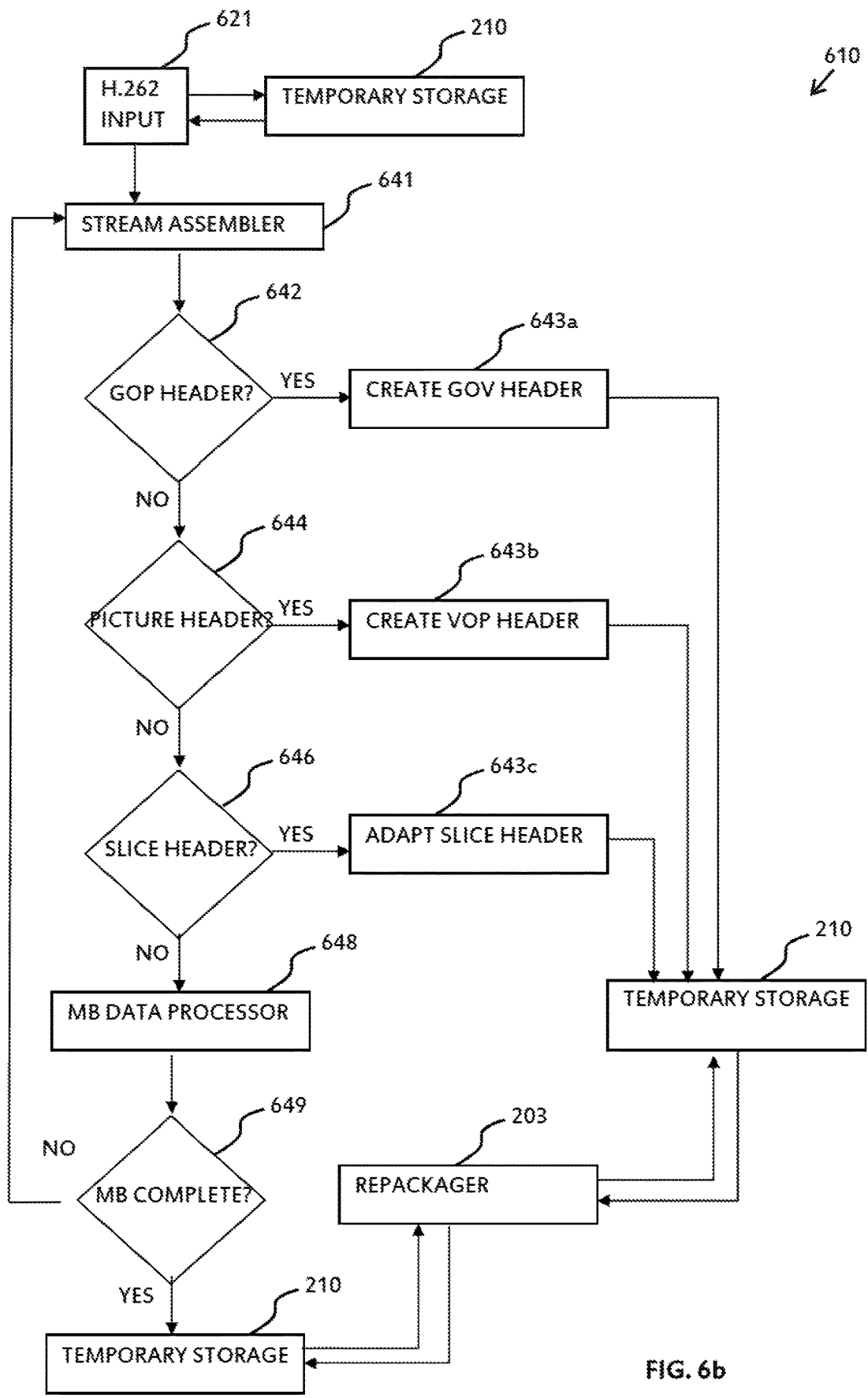
FIG. 6b is a logical flow diagram illustrating an exemplary method for stream processing useful in lightweight transcoding according to the present disclosure.

FIG. 6b illustrates one exemplary method for stream processing 610 according to the present disclosure. As shown, an H.262 (or H.261) is input from temporary storage 210 at step 621. The stream assembler receives the input at step 641 and determines whether a GOP header is present (step 642) and if so generates a GOV header therefrom (step 643a). After the GOP header has been removed, it is determined whether a picture header is present (step 644) and if so a VOP header is created from the picture header information (step 643b). After the picture header has been removed, it is determined whether a slice header is present (step 646) and if so the slice header is adapted (step 643c). The new headers 643a, 643b, and 643c are then stored in temporary storage 210 and are utilized in repackaging (discussed below).

The header-less data is processed using an MB Data processor 648. It is determined at step 649 whether MB data processing is completed and if not, the process continues again at the stream assembler (step 641). When the MB data processing is complete, the processed data is placed in temporary storage 210 and the process proceeds to the repackager 203 for entropy decoding 612 (as discussed below).

Figure 6C:
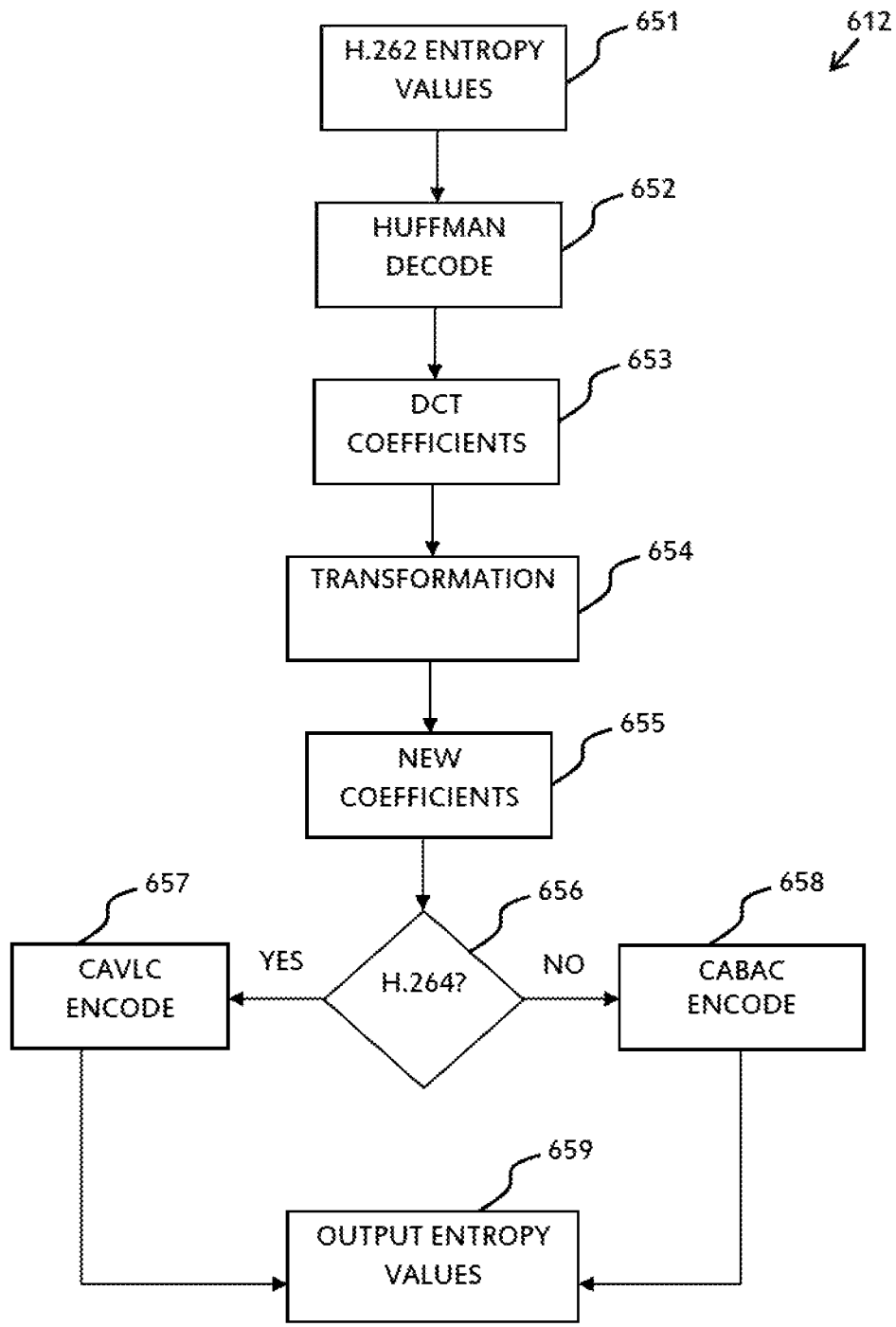
FIG. 6c is a logical flow diagram illustrating an exemplary method for entropy decoding useful in lightweight transcoding according to the present disclosure.

Referring now to FIG. 6c, an exemplary entropy decoding method 612 is illustrated. As shown, per step 651, H.262 (or H.261) entropy values are obtained (such as from the data streams held in temporary storage 210). The entropy values are decoded at step 652 using Huffman decoding, which is well-known in the art and DCT coefficients are obtained (step 653). The DCT coefficients are then transformed (step 654) to create new coefficients (step 655).

At step 656, it is determined whether an H.264 or H.265 stream is to be created. If the new codec is to be H.264, context-adaptive variable length coding (CALVC) entropy coding is performed at step 657 and new entropy values are output at step 659. CALVC is a well-known form of entropy coding used for H.264 video encoding. In the present example, it is used to encode residual, zig-zag order blocks of transform coefficients. Alternatively, if the new codec is to be H.265, context-adaptive binary arithmetic coding (CABAC) entropy coding is performed at step 658 and new entropy values are outputted at step 659. CABAC is a well-known form of entropy coding used for H.265 video encoding. The new entropy values are utilized in repackaging (discussed below).

Figure 6D:
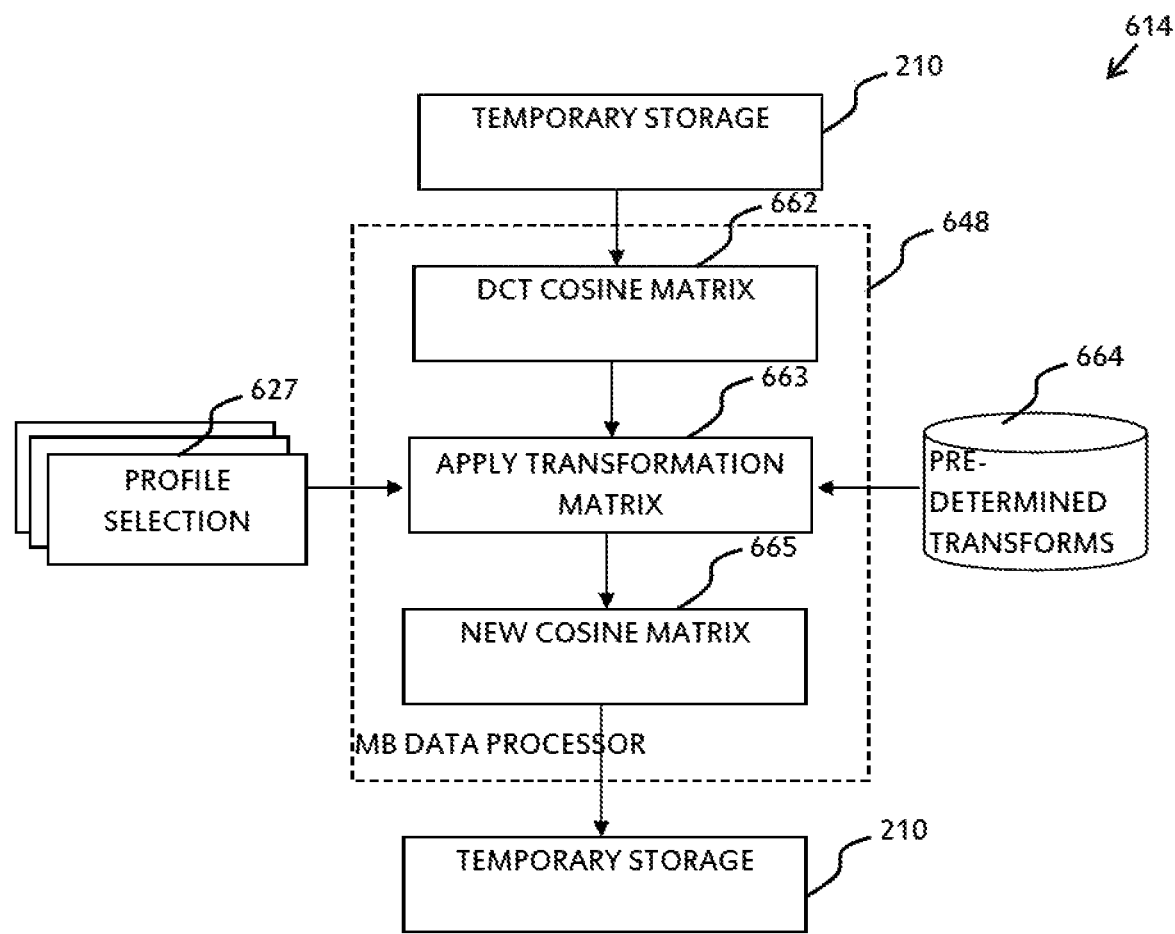
FIG. 6d is a logical flow diagram illustrating an exemplary method for matrix retransformation useful in lightweight transcoding according to the present disclosure.

FIG. 6d illustrates one exemplary method for matrix retransformation 614. As shown, per step 662, a DCT cosine matrix is obtained by the MB data processor 648 from the streams in temporary storage 210. A transformation is applied at step 663 either from a selected profile 627 or from among one of a plurality of pre-determined transforms 664. A new cosine matrix is thereby generated (step 665) and placed in temporary storage 210. The new cosine matrix is utilized in repackaging (discussed below).

Figure 6E:
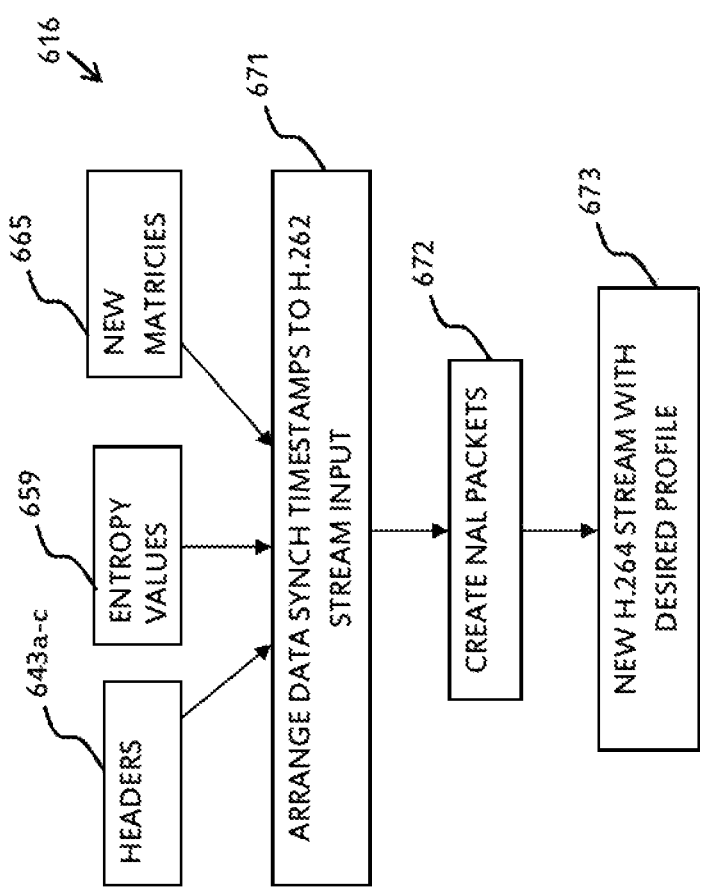
FIG. 6e is a logical flow diagram illustrating an exemplary method for repackaging useful in lightweight transcoding according to the present disclosure.

FIG. 6e illustrates the final repackaging process 616 associated with the lightweight transcoding discussed herein. As shown, the new headers 643a, 643b, and 643c, new entropy values 659, and new matrices 665 are utilized such that data synch timestamps are arranged to match those of the original H.262 stream input (step 671). At step 672, network abstraction layer (NAL) packets are created in accordance with H.264 coding standards. Finally, at step 673 a new H.264 stream with the desired profile is output. It is appreciated, however, that similar repackaging techniques may be utilized to generate an H.265 stream output as well.

Figure 7:
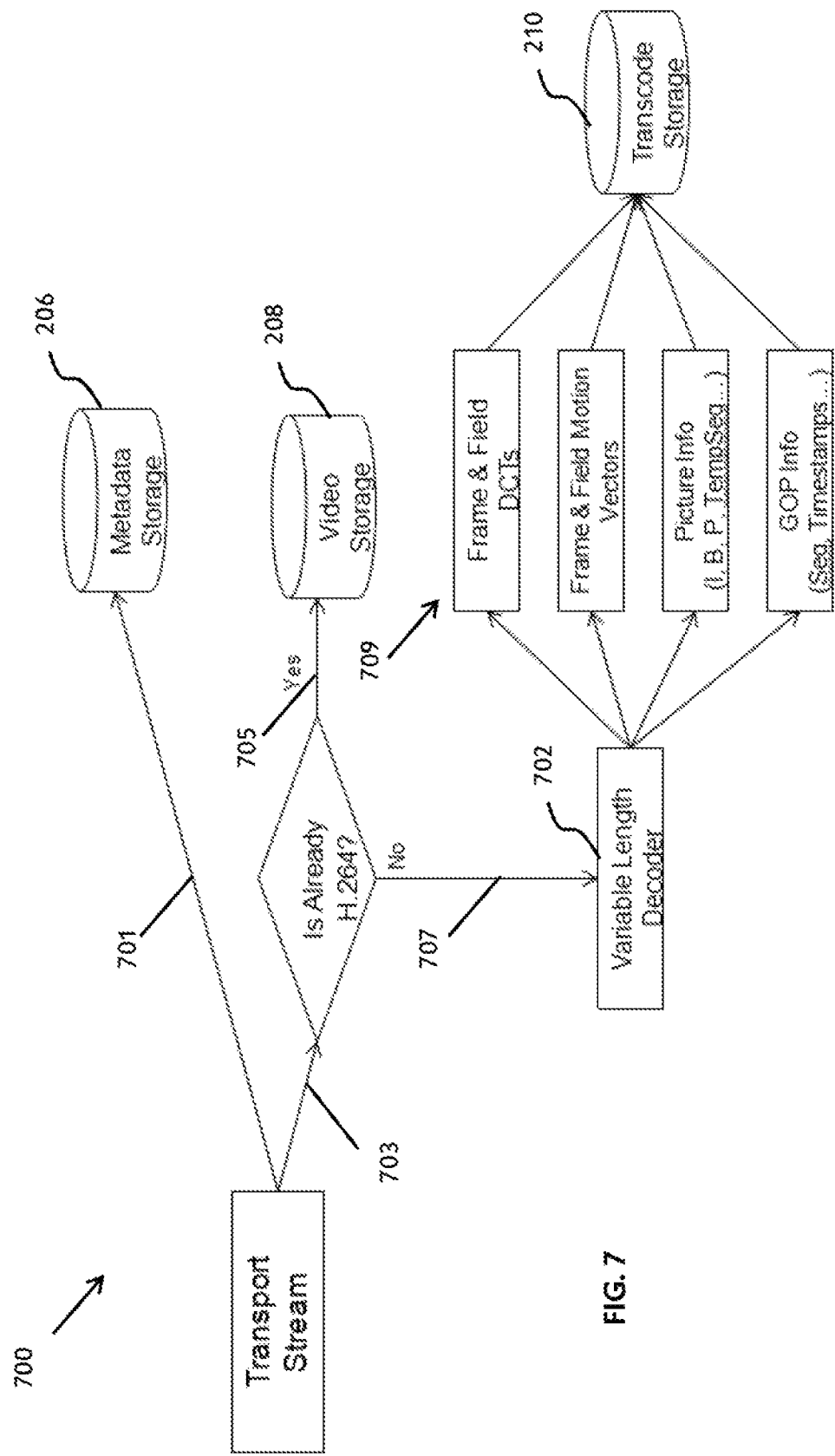
FIG. 7 is a functional block diagram illustrating an exemplary process for partial data decoding to a disk according to the present disclosure.
Figure 8:
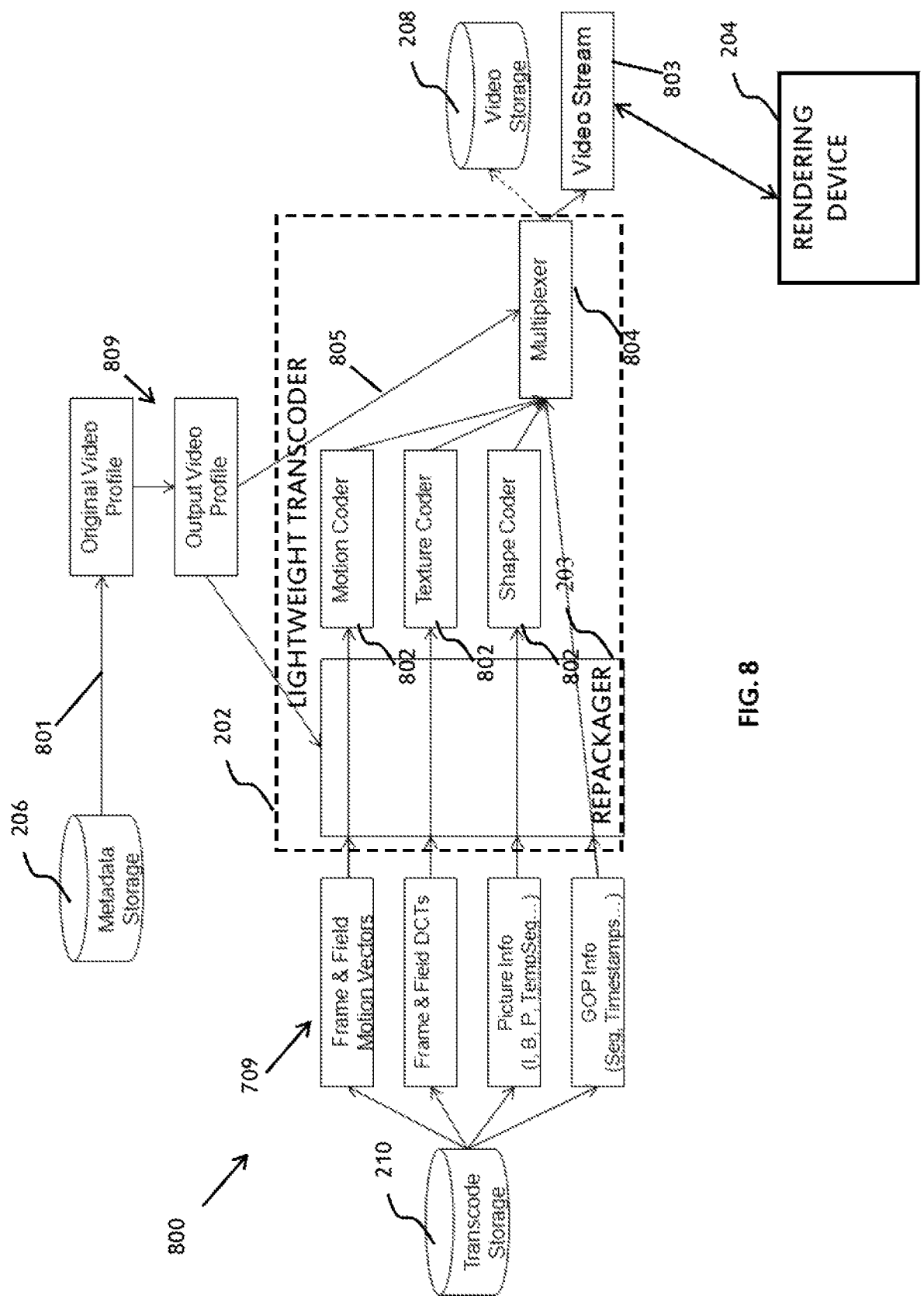
FIG. 8 is a functional block diagram illustrating an exemplary process for lightweight data transcoding for delivery to a rendering device according to the present disclosure.

FIG. 7 illustrates another exemplary process 700 for the partial data decoding discussed at step 610 of FIG. 6 and FIG. 8 illustrates another exemplary process 800 for the repackaging of data discussed at step 616 of FIG. 6 and delivery of repackaged content to a rendering device discussed at step 618 of FIG. 6. It is appreciated that although the illustrated embodiments specifically discuss H.262 to H.264 transcoding and delivery of H.264 content, the apparatus and processes disclosed herein are equally applicable to transcending from any of the given formats to another one of the given formats, the foregoing being exemplary of the overall concepts disclosed herein.

As shown in FIG. 7, the partial decode occurs when a transport stream is received within a premises network. Metadata relating to the stream is stored at metadata storage 206 per 701. Per 703, the stream is passed to an entity for determining whether it is in an appropriate format (in the given example, H.264 format). As noted above, the entity charged with this evaluation may comprise a gateway entity within the premises, the lightweight transcoder (whether in the premises or at a network), or other network entity.

If the content is in the appropriate (H.264) format, it is passed at 705 to the video storage apparatus 208. If the content is not in the appropriate format, it is passed to a variable length decoder 702. The variable length decoder, 702 is, in one embodiment, a software application run on the lightweight transcoder 202. Alternatively, the variable length decoder 702 may be run on another device within the premises (e.g., the gateway apparatus, not shown) or at the network edge.

The variable length decoder 702 decompresses the received content into an intermediate format represented by the data obtained from the decompression techniques 709. Specifically in a first decompression technique, DCT coefficients for I-frames, B and P-frames are derived to arrive at the complete set of coefficients for those respective frames. It is noted that an inverse DCT algorithm is, in one embodiment, specifically not utilized so as to conserve processing resources. That end result is then used to create the transforms used for the H.264 (or H.265) output. In another decompression technique, field and frame motion vectors are extracted from the compressed motion data (which describes object change from frame to frame). Next, picture information is obtained to determine which frames are interlaced, bi-directional, or progressive. Finally, group of pictures (GOP) information is obtained from the compressed data which indicates timestamps for each frame.

Once the data is decompressed, it is stored at the transcode or temporary storage apparatus 210. The temporary storage entity 210 is, in one embodiment, large enough to accommodate data to enable time-shifting for twice the amount of time required for all transformation operations for a given device to be completed.

Referring now to FIG. 8, repackaging and delivery of data is illustrated. As shown, the data 709 which is stored in temporary storage 210 comprises at least frame and field motion vectors, frame and field DCTs, picture information and GOP information. The data 709 is transmitted to a lightweight transcoder entity 202 for motion, texture, and shape coding 802 to arrive at repackaged data. The motion coder determines where and how sets of blocks have moved from frame to frame and uses this information to generate compressed data. The texture coder uses the DCTs to create a compressed signal by identifying information which has changed (other than motion). Finally, a shape coder is used to force the data into an H.264 shape. In one embodiment the shape which is used is a rectangle therefore causing decoding at the rendering device 204 of the entire screen. The repackaging process discussed herein may occur immediately upon receipt of content at the temporary storage 210 (so as to provide near-live streaming of received content) and/or upon user request.

In the illustrated example, metadata stored at the metadata storage entity 206 is transformed from an original video profile to an output video profile 809 by adding mapping information and information regarding the profiles supported. The output video profile and the repackaged data are then provided (at 805) to a multiplexer entity 804 of the transcoder 202. In an alternate embodiment, the multiplexer 804 may be separate from the transcoder 202 yet in communication therewith. The multiplexer 804 causes the metadata and repackaged content to be provided as a single data stream 803 to a rendering device 204 or to storage 208 for subsequent delivery to a capable rendering device 204 (i.e., a rendering device which is configured to decode and display (or cause to be displayed) H.264 content in the present example).

Although the foregoing example of FIGS. 7-8 illustrated specifically H.262 to H.264 transcoding, it is appreciated that any of the herein disclosed lightweight transcoding schemes, including but not limited to those discussed in FIGS. 3-5 above, may be utilized consistent with the present invention. In other words, the partial decode and subsequent repackaging of the received content may occur in any manner which accomplishes the overall schemes identified in FIGS. 3-5.

Lightweight Transcoder Apparatus—

Figure 9:
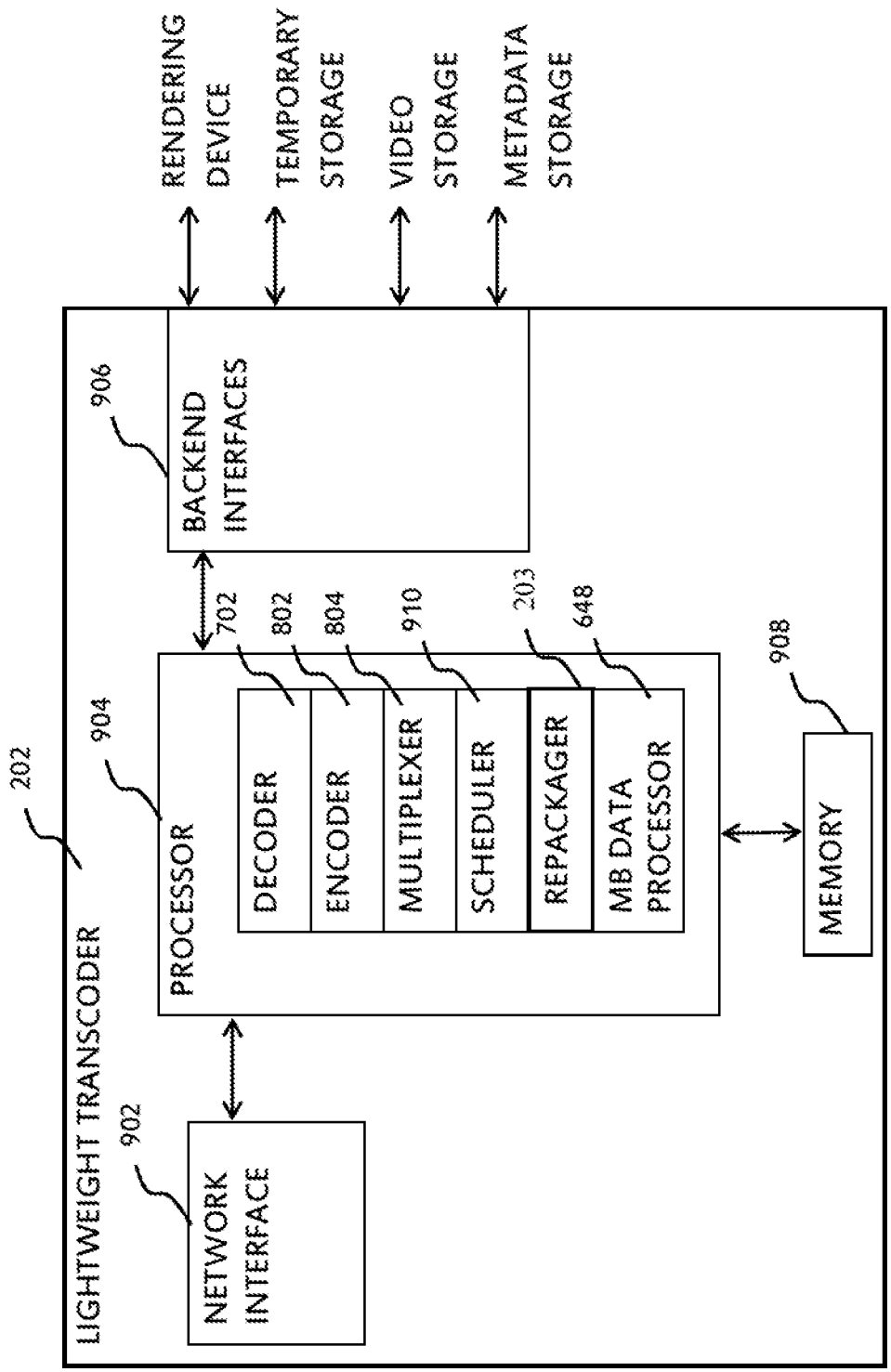
FIG. 9 is a functional block diagram illustrating one embodiment of a lightweight transcoding apparatus according to the present disclosure.

FIG. 9 illustrates an exemplary lightweight transcoder apparatus 202. As shown the apparatus 202 generally comprises a network interface 902, a processor 904, a plurality of backend interfaces 906, and memory 908.

The network interface 902 is configured to enable communication between the lightweight transcoder 202 and the content delivery network. The transcoder receives data from and communicates to various network entities via the interface 902. Communication may be effected via any signal or data interface including, e.g., a radio frequency tuner (e.g., in-band or OOB, cable modem, etc.), Wi-Fi, and/or Wi-MAX, etc. In one embodiment, in addition to the programming content, one or more of the lightweight transcoder applications discussed herein are provided via the network interface 902.

The backend interfaces 906 are configured to enable communication between the transcoder apparatus 202 and the various premises network devices including e.g., metadata storage 206, video storage 208, temporary storage 210, and a plurality of rendering devices 204. Communication is enabled via e.g., Firewire, USB, Ethernet, MoCA, Wi-Fi, Wi-MAX, etc. interfaces.

The storage apparatus 908 is configured to store a plurality of information used by the transcoder 202. For example, information relating each rendering device 204 to a particular user or subscriber account may be stored. Additionally, information relating to the capabilities of each of the registered rendering devices may also be stored. Moreover, content requests and scheduling data for each rendering device 204 are also stored.

The digital processor 904 of the transcoder apparatus 202 is configured to run a plurality of software applications thereon. A decoder application 702, an encoder application 802, a multiplexer 804, and a scheduler 910 are illustrated; however, other applications necessary to complete the herein described lightweight transcoding process may also be provided. Alternatively, one or more of the decoder 702, the encoder 802, the multiplexer 804, and/or the scheduler 910 may be configured to run on a device which is separate from yet in communication with the transcoder apparatus 202.

The decoder application 702 is a software application which enables the transcoder 202 to partially decode received content as discussed elsewhere herein. Specifically, the decoder application 702 unpackages the received content into an intermediate format represented by the data obtained from one or more techniques. In one specific embodiment, the decoder application 702 utilizes one or more of a DCT algorithm, a field and frame motion vectors extraction algorithm, decompression to obtain picture information and GOP information. The decompressed intermediate data structure is stored in the temporary storage 210 via transmission thereto via the appropriate backend interface 906.

The encoder application 802 is a software application which enables the transcoder 202 to repackage the partially decoded data structure generated by the decoder application 702. In one variant, the encoder application performs motion, texture, and shape coding of the content to arrive at repackaged data. In another alternative, the repackaging techniques discussed herein with respect to FIGS. 3-5 are performed by the encoder application 802 to encode the content.

The multiplexer application 804 is a software application which enables output video profile data and the repackaged content to be provided as a single data stream to a rendering device 204 or to a storage apparatus 208 (for subsequent delivery to a capable rendering device 204).

Finally, the scheduler application 910 is a software application which generates a user interface by which a user of a rendering device 204 may define a date and/or time at which content is to be delivered. For example, a user of the rendering device 204 may access the scheduler application 910 to determine that particular content is broadcast at 8:00 pm, Tuesday. The scheduler then may utilize the previously disclosed look-ahead features to predict a delay time associated with transcoding the particular content (based on its bitrate requirement, length, etc.). Alternatively, delay information may simply be provided to the scheduler 910 from a network entity. In either instance, the delay is added to the broadcast time, thus the user may select to have delivery of the content at, e.g., 8:01 pm, Tuesday (after the appropriate delay time has elapsed). Prior to the time for delivery selected by the user, the scheduler application 910 causes the transcoder to obtain the desired content and begin transcoding. The time at which the transcoding is scheduled to occur may coincide with the amount of time of the delay associated with the transcoding process.

It will be recognized that while certain aspects are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the techniques and architectures disclosed herein. This description is in no way meant to be limiting, but rather should be taken as illustrative of the general principles of the disclosure. The scope of the disclosure should be determined with reference to the claims.

What is claimed is:

1. A computerized method for transcoding media data encoded according to a first format into second media data compatible with a second format, the computerized method for transcoding comprising:
    partially decoding of the media data, thereby resulting in decoded media data portions and a plurality of undecoded media data portions, wherein at least one of the decoded media data portions includes a plurality of video frames of the media data;
    storing the decoded media data portions into an ephemeral storage apparatus, the ephemeral storage apparatus comprising an amount of storage to accommodate data to enable time-shifting for at least twice an amount of time required for all transformation operations for a given device to be completed, the all transformation operations comprising:
    (i) removing header portions indicative of the first format from the plurality of video frames;
    (ii) adding header portions indicative of a second format to the plurality of video frames, the second format comprising a high efficiency video coding (HEVC) format;
    (iii) obtaining discrete cosine transform (DCT) coefficients of the plurality of video frames;
    (iv) transforming the DCT coefficients to create new coefficients;
    (v) re-encoding the plurality of video frames using the new coefficients; and
    (vi) combining the plurality of undecoded media data portions with the re-encoded plurality of video frames to obtain the second media data.

2. The computerized method of claim 1, wherein the re-encoding the plurality of video frames comprises re-encoding the plurality of video frames to context-adaptive binary arithmetic coding (CABAC).

3. The computerized method of claim 1, further comprising repackaging each of the plurality of video frames as a video object having a single sequence, a single object, and a single layer, wherein the single layer is video object plane (VOP) layer 0, wherein utilization of the VOP layer 0 eliminates a need for any prediction between planes.

4. The computerized method of claim 3, wherein the repackaging each of the plurality of video frames as the video object comprises setting I, B, and P frames of the plurality of video frames to respective I, B, and P video objects within VOP background layer.

5. The computerized method of claim 1, further comprising assigning the decoded media data portions a single shape within the HEVC format, wherein the single shape is a rectangle.

6. The computerized method of claim 1, wherein the re-encoding the plurality of video frames comprises specifying a four-sided shape which is to be used in subsequent decoding by a rendering device.

7. The computerized method of claim 1, wherein the plurality of video frames of the media data do not include all video frames associated with the media data.

8. The computerized method of claim 1, wherein the removing header portions indicative of the first format from the plurality of video frames and the adding header portions indicative of the second format to the plurality of video frames comprises, based at least on a determination that a group of pictures (GOP) header is present in the decoded media data portions:
    extracting GOP header data from the GOP header;
    generating a group of video objects (GOV) header using the GOP header data; and
    removing the GOP header.

9. The computerized method of claim 1, wherein the removing header portions indicative of the first format from the plurality of video frames and the adding of the header portions indicative of the second format to the plurality of video frames comprises, based at least on a determination that a GOP header is not present in the decoded media data portions and that a picture header is present in the decoded media data portions:
    extracting picture header data from the picture header;
    generating a video object plane (VOP) header using the picture header data; and
    removing the picture header.

10. The computerized method of claim 1, wherein the removing of the header portions indicative of the first format from the plurality of video frames and the adding of the header portions indicative of the second format to the plurality of video frames comprises, based at least on a determination that a GOP header and a picture present are not present in the decoded media data portions and that a slice header is present in the decoded media data portions:
    adapting the slice header within the header portions indicative of the second format to the plurality of video frames.

11. The computerized method of claim 1, wherein the transcoding of the media data encoded according to the first format into the second media data compatible with the HEVC format does not utilize multiple reference frames, and wherein the not utilizing the multiple reference frames enables the transcoding of the media data with a reduced bandwidth requirement relative to a bandwidth associated with utilizing the multiple reference frames.

12. The computerized method of claim 1, wherein the HEVC format comprises H.265.

13. A reduced-complexity transcoder apparatus configured to transform content from a first format to a second format different from the first format, the reduced-complexity transcoder apparatus comprising:

at least one data interface configured for data communication with a premises network, the premises network in data communication with at least a computerized user device;

at least one backend interface configured for data communication with at least the computerized user device;

a digital processor apparatus; and a storage apparatus in data communication with the digital processor apparatus and having at least one computer program disposed thereon, the at least one computer program being configured to, when executed on the digital processor apparatus, cause the reduced-complexity transcoder apparatus to:

access an ephemeral storage apparatus to obtain a plurality of intermediate data resulting from a partial decode of an input stream comprising the content, the ephemeral storage apparatus comprising an amount of storage to accommodate data to enable time-shifting for at least twice an amount of time required for completion of transformation operations necessary to transform the content from the first format to the second format, the transformation operations comprising a transcoding process, the transcoding process comprising:

a processing of the plurality of intermediate data;

application of entropy decoding to the processed plurality of intermediate data;

performance of a matrix retransformation process associated with the processed plurality of intermediate data; and performance of a re-packaging process to output the content in the second format.

14. The reduced-complexity transcoder apparatus of claim 13, wherein:

the processing of the plurality of intermediate data comprises:

obtainment of a plurality of video frames from the plurality of intermediate data;

obtainment of group of pictures (GOP) information from the plurality of intermediate data;

reclassification of the plurality of video frames as a plurality of video objects within a single video object plane (VOP); and reclassification of the GOP information as group of video objects (GOV) information;

the application of the entropy decoding comprises:

a re-encoding of the plurality of intermediate data using the plurality of video objects and the GOV information to produce re-encoded content data; and the performance of the re-packaging process comprises:

combination of the re-encoded content data into a plurality of undecoded content portions remaining from the partial decode of the input stream to produce second digital content compatible with the second format.

15. The reduced-complexity transcoder apparatus of claim 14, wherein the second format comprises a High Efficiency Video Coding (HEVC) format, and the single VOP comprises a VOP background layer.

16. The reduced-complexity transcoder apparatus of claim 15, wherein the second format further comprises an Advanced Video Coding (AVC) format.

17. The reduced-complexity transcoder apparatus of claim 14, wherein the obtainment of the plurality of video frames comprises a process which does not utilize an inverse discrete cosine transform (DCT) algorithm, in order to conserve processing resources.

18. The reduced-complexity transcoder apparatus of claim 13, wherein the at least one computer program is further configured to, when executed on the digital processor apparatus, cause the reduced-complexity transcoder apparatus to:

receive registration data associated with the computerized user device, the registration data instructing the reduced-complexity transcoder apparatus to automatically, upon detection that the computerized user device is in use, commence the transcoding process;

wherein the commencement of the transcoding process is effected based on the registration data.

19. The reduced-complexity transcoder apparatus of claim 13, wherein the at least one computer program is configured to, when executed on the digital processor apparatus, cause the reduced-complexity transcoder apparatus to:

pre-scan the content to determine particular portions of the content associated with a delay corresponding to a time required to perform the transcoding process;

determine the delay using the particular portions of the content;

determine that the delay would not be detectable by a user of the computerized user device at a particular time; and deliver the content in the second format to the computerized user device at the particular time.

20. The reduced-complexity transcoder apparatus of claim 19, wherein the at least one computer program is configured to, when executed on the digital processor apparatus, cause the reduced-complexity transcoder apparatus to:

select the particular time for the delivery of the content in the second format to the computerized user device based on the determination that the delay would not be detectable by the user of the at least the computerized user device at the particular time.

21. The reduced-complexity transcoder apparatus of claim 13, wherein the at least one computer program is further configured to, when executed on the digital processor apparatus, cause the reduced-complexity transcoder apparatus to:

identify the at least the computerized user device for the delivery of the content; and select one or more transcoding profiles based on data related to the identified at least the computerized user device.

22. The reduced-complexity transcoder apparatus of claim 21, wherein the at least one computer program is further configured to, when executed on the digital processor apparatus, cause the reduced-complexity transcoder apparatus to:

select the transcoding process based at least on the selected one or more transcoding profiles.

23. A computerized method providing digital media content to a plurality of computerized user devices located at a user premises, the computerized method comprising:

partially decoding media content data encoded in a first format, thereby resulting in intermediate media content data and undecoded media content data;

storing the intermediate media content data in a temporary storage apparatus, the temporary storage apparatus comprising an amount of storage to accommodate enough data to enable time-shifting for at least twice an amount of time required for completion of any transformation operations required to transform the media content data encoded in the first format to second digital content compatible with a second format, the transformation operations comprising a transcoding process;

accessing the temporary storage apparatus to obtain the intermediate media content data;

performing the transcoding process, the performing comprising processing the intermediate media content data to obtain processed data encoded in the second format; and combining the undecoded media content data and the processed data to obtain the second digital content compatible with the second format.

24. The computerized method of claim 23, further comprising:

accessing data relating to at least one entitlement; and using the data relating to the at least one entitlement to determine that a first computerized user device of the plurality of computerized user devices is entitled to access the media content data;

wherein the accessing the temporary storage apparatus and obtaining the intermediate media content data is based on the determination.

25. The computerized method of claim 23, further comprising:

determining particular portions of the intermediate media content data having bitrate requirements associated with a prescribed level of bitrates;

based on the determining of the particular portions of the intermediate media content data having the bitrate requirements, determining a particular time period at which a delay corresponding to an amount of time required to perform at least one transcoding process is non-detectable by one or more of the plurality of computerized user devices; and determining a time at which to stream the second digital content compatible, the determining comprising adding the particular time period to an original broadcast of the media content data.

26. The computerized method of claim 23, further comprising:

receiving registration data associated with a first computerized user device of the plurality of computerized user devices;

based on the registration data, determining a time, prior to a previously scheduled time of intended use of the media content data, at which to commence the transcoding process;

selecting a particular time period for delivery of the second digital content compatible with the second format to the first computerized user device;

wherein the performing of the transcoding process comprises performing the transcoding process at the time, prior to the previously scheduled time of the intended use of the digital media content; and providing the second digital content to the first computerized user device during the particular time period.

27. The computerized method of claim 26, further comprising:

performing determination that a delay corresponding to an amount of time required to perform at least one transcoding process is non-detectable by a user of the first computerized user device at the particular time period;

wherein the selecting the particular time period for the delivery of the second digital content to the first computerized user device is based at least on the performing the determination.

28. The computerized method of claim 23, wherein the processing the intermediate media content data to obtain the processed data encoded in the second format comprises:

categorizing a plurality of video frames of the intermediate media content data as a plurality of High Efficiency Video Coding (HEVC) video objects, each of the plurality of HEVC video objects including a single sequence, a single object, and a single layer.

29. A computerized method for transcoding media data encoded according to a first format into second media data compatible with a second format, comprising:

partially decoding the media data, thereby obtaining at least one decoded media data portion and at least one undecoded media data portion, wherein the at least one decoded media data portion includes a plurality of video frames of the media data;

storing the at least one decoded media data portion in an ephemeral storage apparatus, the ephemeral storage apparatus comprising an amount of storage to accommodate data to enable time-shifting for at least twice an amount of time required for completion of one or more transformation operations necessary to transform the media data from the first format to the second format, the one or more transformation operations comprising a transcoding process; and performing the transcoding process by:

processing of the at least one decoded media data portion;

applying entropy decoding to the at least one decoded media data portion;

performing a matrix retransformation process associated with the at least one decoded media data portion; and performing a re-packaging process to output the second media data in the second format.

30. The computerized method of claim 29, further comprising:

evaluating at least portions of the media data to predict a period of time of delay associated with the transcoding of the media data;

determining a time at which to stream the transcoded media data, the determining comprising adding the period of time of delay to a time of an original broadcast of the media data to determine a second time at which to stream the transcoded media data; and cause streaming of the transcoded media data at the second time.

31. The computerized method of claim 30, wherein the evaluating of the at least portions of the media data to predict the period of time of delay associated with the transcoding of the media data is based on one or more of: (i) in-bound quality, (ii) bandwidth availability, or (iii) bitrate requirements, of the at least portions of the media data.

32. The computerized method of claim 29, further comprising selectively determining to at least intentionally skip use of one or more features of the second format as part of said transcoding, the one or more features of the second format comprising at least use of spatial prediction.

33. The computerized method of claim 32, wherein the selectively determining is based at least in part on an identity of the first format and an identity of the second format.

34. The computerized method of claim 32, wherein the selectively determining to at least intentionally skip the use of the one or more features of the second format comprises skipping use of multiple reference frames, the skipping which enables the transcoding of the media data with a reduced bandwidth requirement relative to a bandwidth associated with utilizing the multiple reference frames.

* * * * *